US010476602B2

(12) United States Patent
Takechi

(10) Patent No.: US 10,476,602 B2
(45) Date of Patent: Nov. 12, 2019

(54) OPTICAL CIRCUIT

(71) Applicant: Sumitomo Electric Industries, Ltd., Osaka-shi (JP)

(72) Inventor: Masaru Takechi, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 16/229,083

(22) Filed: Dec. 21, 2018

(65) Prior Publication Data

US 2019/0196097 A1 Jun. 27, 2019

(30) Foreign Application Priority Data

Dec. 26, 2017 (JP) .................................. 2017-249025

(51) Int. Cl.
*H04B 10/61* (2013.01)
*G02B 6/126* (2006.01)
(Continued)

(52) U.S. Cl.
CPC ......... *H04B 10/61* (2013.01); *G02B 6/12004* (2013.01); *G02B 6/126* (2013.01); *G02B 6/12007* (2013.01); *H04B 10/611* (2013.01); *H04B 10/614* (2013.01); *G02B 6/29344* (2013.01); *G02B 2006/1209* (2013.01); *G02B 2006/12116* (2013.01)

(58) Field of Classification Search
None
See application file for complete search history.

(56) References Cited

U.S. PATENT DOCUMENTS

2010/0166427 A1* 7/2010 Jeong ................ G02B 6/12004
398/82
2010/0303476 A1* 12/2010 Barton ................ H04B 10/505
398/212

(Continued)

FOREIGN PATENT DOCUMENTS

WO 2011/027895 A1 10/2011

OTHER PUBLICATIONS

Seok-Hwan Jeong and Ken Morito, "Novel Optical 90° Hybrid with Low Wavelength Sensitive Power Balance and Phase Deviation over 94 nm wide Spectral Range", ECOC 2009, Paper 2.2.3, pp. 20-24, Sep. 2009.
Takechi; M., Tateiwa; Y., Ogita; S., "Compact 1000 Coherent Receiver Using InP-Based 90° Hybrid Integrated with Photodiodes", ECOC 2013, Paper p. 2.8.
Seimetz, M. and Weinert C.M., "Options, Feasibility, and Availability of 2×4 90° Hybrids for Coherent Optical Systems", J. of Lightwave Tech. 24(3), (2006), pp. 1317-1322.

(Continued)

*Primary Examiner* — Michael Stahl
(74) *Attorney, Agent, or Firm* — Baker Botts L.L.P.; Michael A. Sartori

(57) ABSTRACT

An optical circuit that monolithically integrates a splitter, two optical 90° hybrids, and first to fourth waveguides on a unique substrate is disclosed. The splitter splits a local beam into first and second local beams each provided to the hybrids through the third and fourth waveguides, while, the signal beam including first and second signal beams each provided to the hybrids through the first and second waveguides without intersecting with the third and fourth waveguides. The hybrids extract in-phase components and quadrature phase components of the first and second signal beams with respect to the first and second local beams, respectively. The phase statuses of the quadrature components against the in-phase components are same in the two hybrids.

14 Claims, 15 Drawing Sheets

(51) Int. Cl.
*G02B 6/12* (2006.01)
*G02B 6/293* (2006.01)

(56) References Cited

U.S. PATENT DOCUMENTS

| | | | |
|---|---|---|---|
| 2012/0106984 A1* | 5/2012 | Jones | H04B 10/60 |
| | | | 398/214 |
| 2012/0207474 A1* | 8/2012 | Inoue | H04B 10/60 |
| | | | 398/65 |
| 2013/0236136 A1* | 9/2013 | Nara | G02B 6/126 |
| | | | 385/11 |
| 2015/0049984 A1* | 2/2015 | Kato | G02F 1/225 |
| | | | 385/31 |
| 2016/0285561 A1* | 9/2016 | Wu | G02B 6/305 |
| 2017/0099110 A1* | 4/2017 | Ogawa | G02B 6/125 |
| 2017/0131473 A1* | 5/2017 | Masuyama | G02B 6/12004 |
| 2017/0192173 A1* | 7/2017 | Evans | G02B 6/28 |

OTHER PUBLICATIONS

Pennings, E.C.M., et al, "Ultracompact, All-Passive Optical 90°-Hybrid on InP Using Self-Imaging", IEEE Photonics Tech. Letters, vol. 5, No. 6, (Jun. 1993), pp. 701-703.

Yagi, H. et. al, "High-Efficient InP-Based Balanced Photodiodes Integrated with 90° Hybrid Mmi for Compact 100 Gb/s Coherent Receiver", OFC 2013 Tech. Digest OW3J.5, (2013).

Tang, Yongbo et. al, "High Performance DP-QPSK Receiver Module incorporating InP-based Integrated Coherent Detection Chip", OFC 2015 Tech. Digest M3C.3, (2015).

"Implementation Agreement for Integrated Dual Polarization Micro-Intradyne Coherent Receivers", Optical Internetworking Forum (OIF), IA # OIF-DPC-MRX-01.0, Mar. 31, 2015.

* cited by examiner

OPTICAL CIRCUIT

CROSS REFERENCE TO RELATED APPLICATIONS

The present application is based on and claims benefit of priority of Japanese Patent Application No. 2017-249025, filed on Dec. 26, 2017, the entire content of which is incorporated herein by reference.

TECHNICAL FIELD

1. Field of Invention

The present invention relates to an optical circuit including an optical 90° hybrid.

BACKGROUND

2. Background Arts

An International Patent Application published by WO2011/027895 has disclosed an optical de-modulator type of planar lightwave circuit (PLC) capable of demodulating a polarization multiplexing signal that multiplexes two optical signals each modulated in phases thereof and having an X-polarization and a Y-polarization, respectively; and an optical communication system implementing the de-modulator with the PLC type.

Recent explosive increase in mass of data to be transmitted through an optical communication system accelerates practical use of a coherent system to increase a transmission speed thereof. The coherent system may carry four data simultaneously per one wavelength by multiplexing two signals each having polarizations orthogonal to each other, namely, the X-polarization and the Y-polarization, and modulating in phases thereof, which is often called as the dual polarization quadrature phase shift keying (DP-QPSK) algorithm. A coherent system uses an optical 90° hybrid to demodulate such an optical signal modulated by the DP-QPSK algorithm. An optical 90° hybrid may extract data by performing interference between an optical signal with the X-polarization and a local beam, and between another optical signal with the Y-polarization and the local beam.

FIG. 15 schematically illustrates a functional block diagram of an optical coherent receiver 100 including a polarization beam splitter (PBS) 102, a beam splitter (BS) 104, a monitor photodiode (PD) 106, two optical 90° hybrids, 111 and 112, four sets of PDs, namely total eight (8) PDs 134, four amplifiers 135, and four sets of, namely eight (8) capacitors 136. Two optical beams, that is, a signal beam Sig and a local beam Loc enter the optical coherent receiver 100 at the respective input ports. The signal beam Sig in a portion thereof split by the BS 108 enters the monitor PD 106 that senses an average intensity of the signal beam Sig, while, another portion thereof reaches the PBS 102 passing a variable optical attenuator (VOA) 110 and is split thereby into an optical signal Sig_x having the X-polarization and another optical signal Sig_y having the Y-polarization. The former signal Sig_x with the X-polarization enters the optical 90° hybrid 111, while, the latter signal Sig_y with the Y-polarization enters the other optical 90° hybrid 112.

The local beam Loc is split by the BS 104, where one of split beam Loc_x enters the optical 90° hybrid 111, while the other split beam Loc_y enters the other optical 90° hybrid 112. The former optical 90° hybrid 111, by performing the interference between the optical signal Sig_x with the X-polarization and the local beam Loc_x, may extract two pairs of optical signals, one of which has a phase component matching with that of the local beam Loc_x, which is denoted as an $X_I$ component, where the subscript I means "in-phase", while, another of which has a phase component quadrature to the local beam Loc_x, which is denoted as an $X_Q$ component where the subscript Q means "quadrature". Similar to the optical 90° optical hybrid 111 described above, the other optical 90° hybrid 112, by performing the interference between the optical signal Sig_y attributed to the Y-polarization and the local beam Loc_y, may extract two pairs of optical signals, one of which has a phase component matching with that of the local beam Loc_y, which is denoted as a $Y_I$ component, while, another of which has a phase component quadrature to the local beam Loc_y, which is denoted as a $Y_Q$ component. Accordingly, two optical 90° hybrids, 111 and 112, are sometimes called as a multi-model interference (MMI) element. The four pairs of the PDs 134 sense respective intensities of those optical signals, $X_I$, $X_Q$, $Y_I$, and $Y_Q$, in the respective differential mode and generate four pairs of photocurrents that are externally output from the optical coherent receiver 100 through the coupling capacitors 136 after the amplifiers convert the photocurrents into voltage signals.

When the two MMI elements, 111 and 112, are monolithically integrated with optical components provided upstream the MMI elements, 111 and 112, on a unique substrate, which may form the optical coherent receiver 100 in a compact size and reduce a number of components, it is inevitable to reverse positions of input ports for the signal beam Sig_y and the local beam Loc_y in the MMI element 112 in order not to intersect waveguides carrying the signal beams, Sig_x and Sig_y, with waveguides carrying the local beams, Loc_x and Loc_y. However, merely reverse of the positions for the input ports in the MMI element 112 disarranges the phase difference between the two pairs of the optical signals, $Y_I$ and $Y_Q$, output from the MMI element 112, which results in two types of amplifiers provided downstream of the respective MMI elements, 111 and 112. That is, the amplifiers 135 set downstream the MMI element 112 are inevitable to have a configuration different from those set downstream the MMI element 111.

SUMMARY

An aspect of the present invention relates to an optical circuit that receives a signal beam and a local beam, where the signal beam is modulated by a configuration of a dual-polarization quadrature phase shift keying (DP-QPSK), and each beams have a wavelength common thereto. The signal beam includes a first signal beam and a second signal beam, where the first signal beam is attributed to a first polarization, while the second signal beam originates to a second polarization that is orthogonal to the first polarization. The optical circuit of the present invention includes a substrate, a splitter, first and second optical 90° hybrids, and first to fourth waveguides. The splitter, the first and second optical 90° hybrids, and the first to fourth waveguides are integrally and monolithically formed in the substrate. The splitter splits the local beam into a first local beam and a second local beam. The first and second optical 90° hybrids complementarily extract in-phase components and quadrature components in the first and second signal beams, respectively; where the in-phase components have phases matching with phases of the first local beam, while, the quadrature components of the first signal beam have phases shifted by 90° with respect to the first and second local beams, respectively. The first and second waveguides provide the first signal beam to the first optical 90° hybrid and the second signal beam to the second optical 90° hybrid, respectively. The third and fourth waveguides provide the first local beam to the first optical 90° hybrid and the second local beam to the second optical 90° hybrid, respectively, without intersecting with the first and second waveguides on the substrate. A feature of the optical circuit of the present invention is that the quadrature components and the in-phase components each extracted in the first optical 90° hybrid have phase statuses identical with phase statuses between the quadrature components and the in-phase components each extracted in the second optical 90° hybrid.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION

Next, some embodiments of an optical circuit according to the present invention will be described referring to accompanying drawings. The present invention, however, is not restricted to those embodiments, and has a scope defined in claims and all changes and modifications equivalent to the claims. Also, in the description of the drawings, numerals or symbols same with or similar to each other will refer to elements same with or similar to each other without duplicating explanations.

First Embodiment

Figure 1:
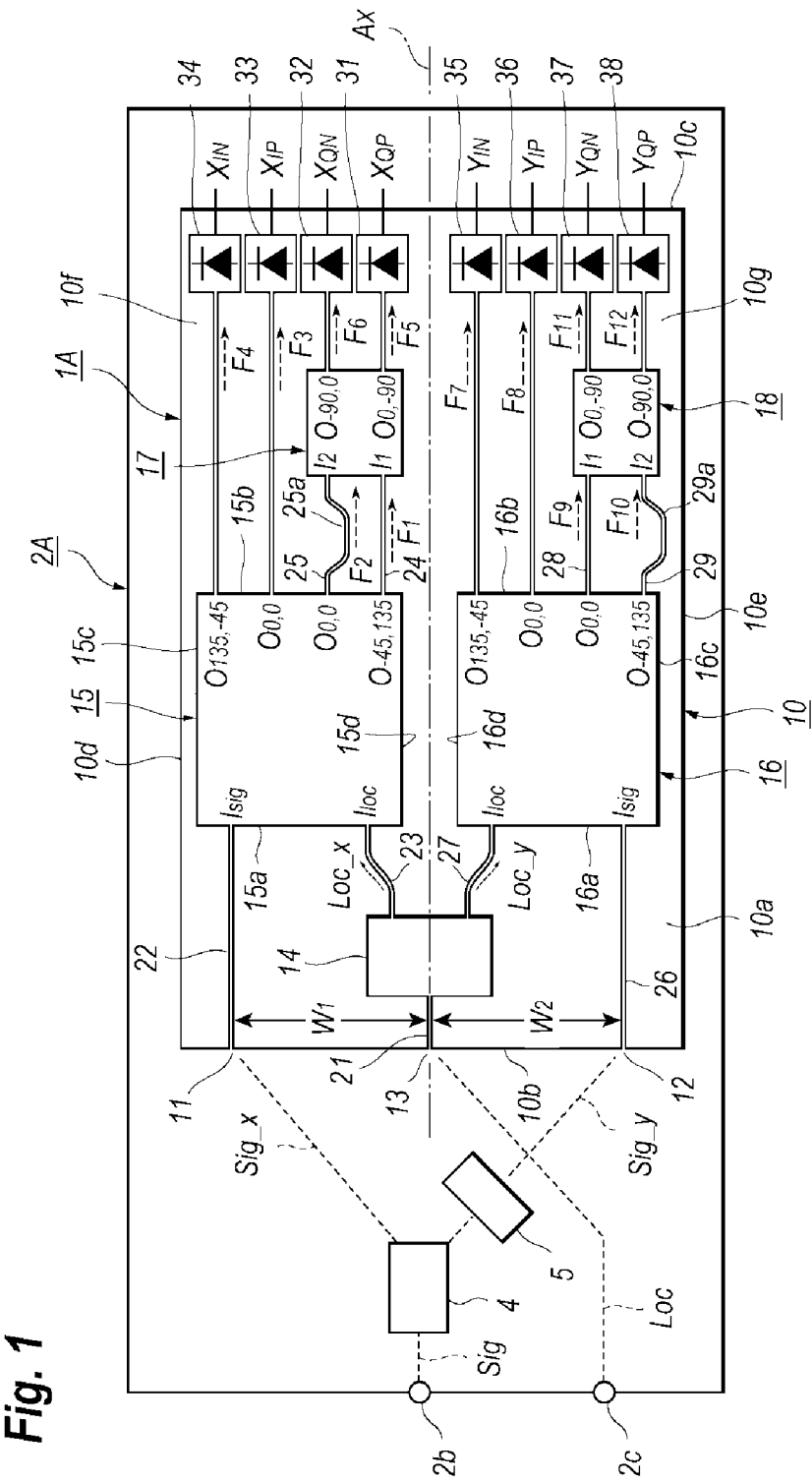
FIG. 1 is a plan view schematically showing an optical circuit 1A according to the first embodiment of the present invention.

FIG. 1 is a plan view schematically showing an optical 90° hybrid 1A, which will be hereinafter simply called as an optical circuit. The optical circuit 1A, which may be implemented within a coherent optical receiver 2A installed within a polarization multiplexing optical coherent system, receives a signal beam Sig_x with an X-polarization, and another signal beam Sig_y with the Y-polarization, and demodulates those signals. The coherent optical receiver 2A further implements a polarization beam splitter (PBS) 4 upstream of the optical circuit 1A, where the PBS 4 provides an input port coupled with the an optical input port 2b of the coherent optical receiver 2A through which the PBS 4 receives an optical signal Sig that is polarization-multiplexed and modulated in optical phases thereof. The PBS 4 further provides two output ports, one of which outputs the signal beam Sig_x with the X-polarization, while, another of which outputs the signal beam Sig_y with the Y-polarization.

The optical circuit 1A provides a substrate 10 that is made of indium phosphide (InP) and has a rectangular slab shape. The substrate 10 provides a plane top surface 10a defined by edges, 10b and 10c, facing to each other and other edges, 10d and 10e, also facing to each other. The former edges, 10b and 10c, extend parallel; while, the latter edges, 10d and 10e, also extend parallel and intersect the former edges, 10b and 10c, by an angle of, for instance, 90°. The former edges, 10b and 10c, are 3.5 to 4.5 mm; while, the latter edges, 10d and 10e, are, for instance, 2.0 to 3.0 mm.

The optical circuit 1A further provides first to third optical input ports, 11 to 13, on the substrate 10. The optical circuit 1A of the present embodiment disposes the optical input ports, 11 to 13, in the edge 10b such that the first and second input ports, 11 and 12, sandwich the third input port 13 therebetween. A span W1 between the first input port 11 and the third input port 13 is equal to a span W2 between the second input port 12 and the third input port 13. The spans, W1 and W2, are set to be, for instance, 0.7 to 0.9 mm.

The first input port 11, which optically couples with the PBS 4 in one of outputs thereof, receives the signal beam Sig_x with X-polarization; while, the second input 12, which optically couples with the other output of the PBS 4 through a polarization rotator 5, receives the beam Sig_y originating to the Y-polarization. The third input port 13, which optically couples with the local port 2c, receives the local beam Loc.

The optical circuit 1A further provides a splitter 14 on the substrate 10. The splitter 14 includes an input port and two outputs, where the input port optically couples with the third input port 13 through a waveguide 21 formed on the substrate 10. The splitter 14 splits the local beam Loc coming from the third input port 13 into first and second local beams, Loc_x and Loc_y, by a splitting ratio of 1:1, where the split local beams, Loc_x and Loc_y, are output from the respective output ports.

The optical circuit 1A further provides four multi-mode interference (MMI) elements, 15 to 18, where two of which are type of 2×4 MMI elements, 15 and 16, having two input ports, $I_{sig}$ and $I_{loc}$, and four output ports, $O_{135,-45}$, $O_{0,0}$, $O_{0,0}$, and $O_{-45,135}$; while, other two MMI elements, 17 and 18, are type of 2×2 MMI elements, 17 and 18, having two input ports, $I_1$ and $I_2$, and two output ports, $O_{0,-90}$ and $O_{-90,0}$, where meanings of subscripts of respective outputs will be described later. The first 2×4 MMI element 15 and the first 2×2 MMI element 17 are disposed in a region 10f of the substrate 10, while, the second 2×4 MMI element 16 and the second 2×2 MMI element 18 are disposed in another region 10g. The third optical input port 13 may be disposed on the axis Ax, while, the first and second optical input ports, 11 and 12, are disposed in sides of the first 2×4 MMI element 15 and the second 2×4 MMI element 16, respectively, with respect to the axis Ax. The second type of the 2×2 MMI elements, 17 and 18, are provided on the substrate 10 and disposed in the sides of the first type of the 2×4 MMI elements, 15 and 16, respectively.

The first 2×4 MMI element 15, which provides a space formed by sides, 15a and 15b, extending parallel to the edges, 10b and 10c, of the substrate 10 and other sides, 15c and 15d, extending parallel to the edges, 10d and 10e, of the substrate 10; but, the sides, 15a and 15b, may be not parallel to the edges, 10b and 10c, and the sides 15c and 15d, may be not parallel to the edges, 10d and 10e. The first 2×4 MMI element 15 includes two input ports, $I_{sig}$ and $I_{loc}$, in the side 15a, while, four output ports, $O_{135,-45}$, $O_{0,0}$, $O_{0,0}$, and $O_{-45,135}$, in the other side 15b. One of the input ports $I_{sig}$, which optically couples with the PBS 4 through a waveguide 22, receives one of the signal beams Sig_x with the X-polarization; while, the other of the input ports which optically couples with the splitter 14 through a waveguide 23, receives one of the local beams Loc_x split by the splitter 14. The four output ports are disposed in the other side 15b and output interfering beams, $F_1$ to $F_4$, respectively, where the interfering beams, $F_3$ and $F_4$, each include positive and negative components, $X_{IP}$ and $X_{IN}$, of the interfering beam for the X-polarization.

The first 2×2 MMI element 17 includes two input ports, $I_1$ and $I_2$, and two output ports, $O_{0,-90}$ and $O_{-90,0}$, where one of the input ports $I_1$ optically couples with the one of the output ports $O_{-45,135}$ of the first 2×4 MMI element 15 through a waveguide 24 to receives the first interfering beam $F_1$; while, the other of the input ports $I_2$ optically couples with the one of the output ports $O_{0,0}$ of the first 2×4 MMI element 15 through a waveguide 25 to receive the second interfering beam $F_2$. The waveguide 25 includes a phase shifter 25a that shifts a phase of the interfering beam $F_2$ by $-45°$ against a phase of the interfering beam $F_1$ propagating in the other waveguide 24. Specifically, the waveguide 25 in an optical length thereof is longer than the other waveguide 24 by a length corresponding to $-45°$ of the phase difference therebetween, and this length may be given by a total length of portions in the phase shifter 25a extending diagonally to the waveguide 24. The two output ports, $O_{0,-90}$ and $O_{-90,0}$, of the first 2×2 MMI element 17 generate the interfering beams, $F_5$ and $F_6$, which correspond to positive and negative quadrature components X-polarization, $X_{QP}$ and $X_{QN}$, respectively, of the signal beam Sig_x with respect to the first local beam Loc_x.

The second 2×4 MMI element 16, which has a space defined by sides, 16a and 16b, extending parallel to the edges, 10b and 10c, of the substrate 10 and sides, 16c and 16d, extending parallel to the edges, 10d and 10e, of the substrate 10; but, the sides, 16a and 16b, may be not parallel to the edges, 10b and 10c, and the sides 16c and 16d, may be not parallel to the edges, 10d and 10e. The second 2×4 MMI element 16, which has a configuration same with that of the first 2×4 MMI element 15, includes two input ports, $I_{sig}$ and $I_{loc}$ in the side 16a, while, four output ports, $O_{135,-45}$, $O_{0,0}$, $O_{0,0}$, and $O_{-45,135}$, in the other side 16b. One of the input ports $I_{sig}$ of the second 2×4 MMI element 16, which optically couples with the second optical input port 12 of the optical circuit 1A through a waveguide 26, receives one of the signal beams Sig_y originating to the Y-polarization; while, the other of the input ports $I_{loc}$ of the second 2×4 MMI element 16, which optically couples with the splitter 14 through a waveguide 27, receives one of the local beams Loc_y split by the splitter 14. The four output ports are disposed in the other side 16b and output interfering beams, $F_7$ to $F_{10}$, respectively, where the interfering beams, $F_7$ and $F_8$, corresponding to the components of the signal beam Sig_y whose phases are in-phase to that of the local beam Loc_y.

The second 2×2 MMI element 18 includes two input ports, $I_1$ and $I_2$, and two output ports $O_{0,-90}$ and $O_{-90,0}$, where one of the input ports $I_1$ optically couples with the one of the output ports $O_{0,0}$ of the second 2×4 MMI element 16 through a waveguide 28 to receives an interfering beam $F_9$, while, the other of the input ports $I_2$ optically couples with the one of the output ports $O_{-45,135}$ of the second 2×4 MMI element 16 through a waveguide 29 to receive another interfering beam $F_{10}$. The waveguide 29 includes a phase shifter 29a that shifts a phase of the interfering beam $F_{10}$ passing therethrough by $-135°$ with respect to a phase of the other interfering beam $F_9$ propagating in the other waveguide 28. Specifically, the waveguide 29 is longer than the other waveguide 28 by a length corresponding to $-135°$ of the phase difference therebetween, and this length may be given by a total length of portions in the phase shifter 29a extending diagonally to the waveguide 28. The two outputs, $O_{0,-90}$ and $O_{-90,0}$, of the second 2×2 MMI element 18 generate the interfering beams, $F_{11}$ and $F_{12}$, which correspond to negative and positive components, $Y_{QN}$ and $Y_{QP}$, respectively, of the signal beam Sig_y originating to the Y-polarization with phases quadrature to the phase of the local beam Loc_y.

The optical circuit 1A further provides photodiodes (PDs), 31 to 38 monolithically integrated with the MMI elements, 15 to 18, on the top surface 10a of the substrate 10.

The PDs, 31 to 38, may be formed by epitaxially growing semiconductor layers on the substrate 10. Although the embodiment monolithically integrates the PDs, 31 to 38, with the MMI elements, 15 to 18, an optical circuit may provide those PDs outside of the substrate 10. The two PDs, 31 and 32, which optically couple with the two output ports, $O_{0,-90}$ and $O_{-90,0}$, of the first 2×2 MMI element 17 through waveguides provided on the substrate 10, convert the interfering beams, $F_5$ and $F_6$, into current signals corresponding to the components, $X_{QP}$ and $X_{QN}$, respectively. The two PDs, 33 and 34, which optically couple with the two output ports, $O_{0,0}$ and $O_{135,-45}$, of the second 2×4 MMI element 15 through waveguides provided on the substrate 10, convert the interfering beams, $F_3$ and $F_4$, into current signals corresponding to the components, $X_{IP}$ and $X_{IN}$, respectively. The two PDs, 35 and 36, which optically couple with the two output ports, $O_{135,-45}$ and $O_{0,0}$, of the second 2×4 MMI element 16 through waveguides provided on the substrate 10, convert the interfering beams, $F_7$ and $F_8$, into current signals corresponding to the components, $Y_{IN}$ and $Y_{IP}$, respectively. The two PDs, 37 and 38, which optically couple with the two output ports, $O_{0,-90}$ and $O_{-90,0}$, of the second 2×2 MMI element 18 through waveguides provided on the substrate 10, convert the interfering beams, $F_{11}$ and $F_{12}$, into current signals corresponding to the components, $Y_{QN}$ and $Y_{QP}$, respectively.

Figure 2:
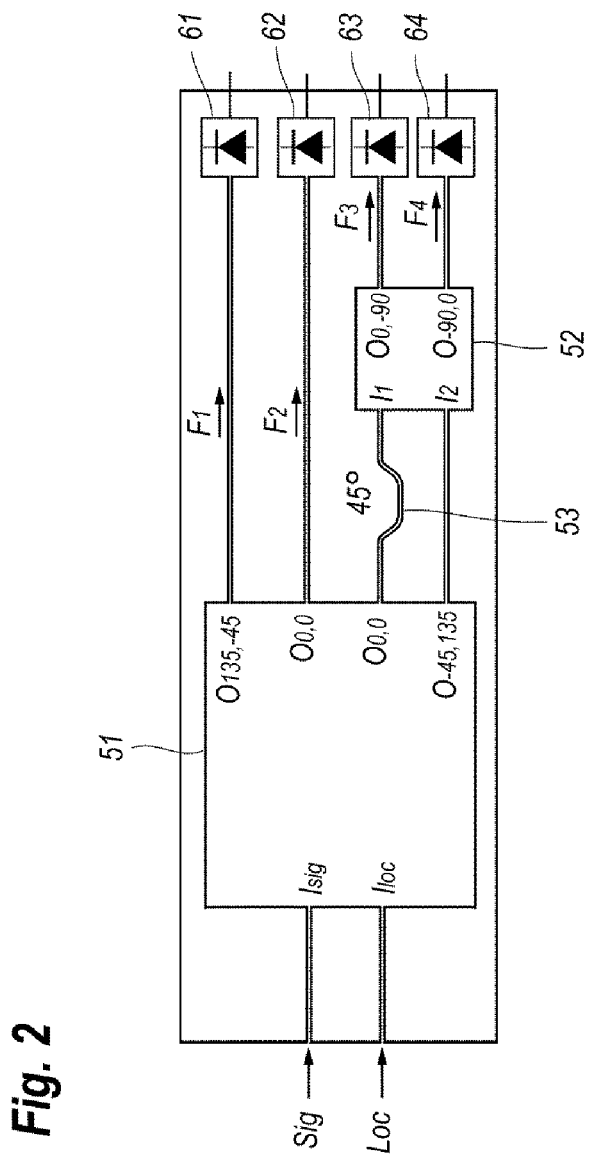
FIG. 2 schematically illustrates an optical 90° hybrid that includes one 2×4 multi-mode interference (MMI) element, one 2×2 MMI element, and a phase shifter therebetween.

Next, an operation and a function of the optical circuit 1A will be described referring to FIG. 2 that explains a fundamental operation of an optical 90° hybrid, where FIG. 2 illustrates one 2×4 MMI element 51 with two input ports, $I_{sig}$ and $I_{loc}$ and four output ports, $O_{135,-45}$, $O_{0,0}$, $O_{0,0}$, and $O_{-45,135}$, where those ports, $I_{sig}$ and $I_{loc}$, $O_{135,-45}$, $O_{0,0}$, $O_{0,0}$, and $O_{-45,135}$, may be regarded as slits opening for the free space with a rectangular shape defined by four sides. FIG. 2 also illustrates another MMI element 52 type of 2×2 MMI element, and four PDs, 61 to 64. A signal beam Sig enters from the input port $I_{sig}$ into the free space, while, a local beam Loc enters from the input port $I_{loc}$ into the free space. The output ports, $O_{135,-45}$, $O_{0,0}$, $O_{0,0}$, and $O_{-45,135}$, are provided in respective positions in a side opposite to the side where the input ports, $I_{sig}$ and $I_{loc}$, are provided. For instance, the output port $O_{135,-45}$ exists at a point with an optical distance of 135° (3λ/8) from the input port $I_{sig}$ and an optical distance of −45° (7λ/8) from the input port $I_{loc}$. Note that a phase of −45° is equivalent to 315° (7λ/8), 675° (7λ/8+λ), and so on, where λ is a wavelength of the signal beam Sig, or the local beam Loc. Also, the output port $O_{0,0}$ exists at a point with an even optical distance from two input ports, $I_{sig}$ and $I_{loc}$. Because optically equivalent points may be exist along the side where the output ports exist, two output ports symbolled by $O_{0,0}$ are different points. The output port $O_{-45,135}$ may be also determined by a manner same with that described above. Also, provided between the two MMI elements, 51 and 52, is a phase shifter 53 that causes 45° delay in an interfering beam output from the output port $O_{0,0}$ of the 2×4 MMI element 51 and entering the first input port $I_1$ of the 2×2 MIMI element 52. The 2×2 MMI element 52 causes an interference between beams each entering the input ports, $I_1$ and $I_2$, and generates two output beams, $F_3$ and $F_4$, output from the output ports, $O_{0,-90}$ and $O_{-90,0}$. The output port $O_{0,-90}$ is set in a side of a free space of the 2×2 MMI element 52 formed by four sides at a point with an optical distance against the first input port $I_1$ equal to 0° (λ), 360° (2λ), and so on and an optical distance against the second input port $I_2$ equal to 270° (−90°, 3λ/4), 630° (3λ/4+λ), and so on; while, the other output port $O_{-90,0}$ is sets at a point causing an optical distance against the first input port $I_1$ that is equal to 270° (−90°, 3λ/4), 630° (3λ/4+λ), . . . , and another optical distance against the second input port $I_2$ that is equal to 0° (λ), 360° (2λ), . . . . Accordingly, selecting the respective outputs, $O_{135,-45}$, $O_{0,0}$, $O_{0,0}$, and $O_{-45,135}$, in the 2×4 MMI element 51, and the output ports, $O_{0,-90}$ and $O_{-90,0}$, in the MMI element 52, the interfering beams, $F_1$ to $F_4$, may vary phases thereof. The 2×4 MMI element 51 causes phase differences between the two input ports, $I_{sig}$ and $O_{loc}$, and the four output ports, $O_{135,-45}$, $O_{0,0}$, $O_{0,0}$, and $O_{-45,135}$, shown in relations listed in Table 1 below. Specifically, a beam entering from the input port $I_{sig}$ advances the phase thereof by 135° when appears at the output port $O_{135,-45}$; while, another beam entering the input port $I_{loc}$ delays the phase thereof by −45° when appears also at the output port $O_{135,-45}$.

TABLE 1

|  | $O_{135,-45}$ | $O_{0,0}$ | $O_{0,0}$ | $O_{-45,135}$ |
| --- | --- | --- | --- | --- |
| $I_{sig}$ | 135 | 0 | 0 | −45 |
| $I_{loc}$ | −45 | 0 | 0 | 135 |

Accordingly, the operation by the MMI element 51 may be denoted as:

$$\begin{pmatrix} E1 \\ E2 \\ E3 \\ E4 \end{pmatrix} = \frac{1}{2} \begin{pmatrix} e^{i135°} & e^{-i45°} \\ 1 & 1 \\ 1 & 1 \\ e^{-i45°} & e^{i135°} \end{pmatrix} \begin{pmatrix} E_{Sig} \\ E_{LO} \end{pmatrix} \quad (1)$$

where $E_{Sig}$ and $E_{Lo}$ correspond to magnitudes of the signal beam Sig and the local beam Loc, while, $E_n$ (n=1 to 4) show magnitudes of the beams appearing at the output ports, $O_{135,-45}$, $O_{0,0}$, $O_{0,0}$, and $O_{-45,135}$, of the 2×4 MMI element 51.

The phase shifter 53 in an operation thereof may be denoted as:

$$\begin{pmatrix} E3' \\ E4' \end{pmatrix} = \begin{pmatrix} e^{-i45°} & 0 \\ 0 & 1 \end{pmatrix} \begin{pmatrix} E3 \\ E4 \end{pmatrix} \quad (2)$$

where $E_3'$ and $E_4'$ correspond magnitudes of the beams at the input ports, $I_1$ and $I_2$, of the 2×2 MIMI element 52. Also, the operation of the 2×2 MMI element 52 may be denoted as:

$$\begin{pmatrix} E3'' \\ E4'' \end{pmatrix} = \frac{1}{\sqrt{2}} \begin{pmatrix} 1 & e^{-i90°} \\ e^{-i90°} & 1 \end{pmatrix} \begin{pmatrix} E3' \\ E4' \end{pmatrix} \quad (3)$$

where $E_3''$ and $E_4''$ are magnitudes of the optical beams output from the 2×2 MMI element 52.

Combining equations (1) to (4), the operation of the optical 90° hybrid according to the embodiments may be denoted as:

$$\begin{pmatrix} E1 \\ E2 \\ E3'' \\ E4'' \end{pmatrix} = \frac{1}{2} \begin{pmatrix} e^{i135°} & e^{-i45°} \\ 1 & 1 \\ e^{-i90°} & 1 \\ e^{-i90°} & e^{i180°} \end{pmatrix} \begin{pmatrix} E_{Sig} \\ E_{LO} \end{pmatrix} \quad (4)$$

Table 2 below summarizes the phases of the signal beam Sig and the local beam Loc appearing in the respective PDs, 61 to 64. That is, the PD 61 may generate a component with a phase difference of 180° between the signal beam Sig and the local beam Loc, while, the PD 62 may generate another component with a phase difference of 0° between the signal beam Sig and the local beam Loc. Accordingly, the PDs, 61 and 62, may complementarily generate the in-phase component between the signal beam Sig and the local beam Loc. Similarly, the PD 63 may generate a component with a phase difference of −90° between the signal beam Sig and the local beam Loc, while, the PD 64 may generate a component of a phase difference of 90° between the signal beam Sig and the local beam Loc. Accordingly, the PDs, 63 and 64, may complementarily generate the quadrature component between the signal beam Sig and the local beam Loc. Thus, two MMI elements, 51 and 52, with the phase shifter 53 may complementarily extract two data from the signal beam Sig.

TABLE 2

|  | $F_1$ | $F_2$ | $F_3$ | $F_4$ |
|---|---|---|---|---|
| $I_{sig}$ | 135 | 0 | −90 | −90 |
| $I_{loc}$ | −45 | 0 | 0 | 180 |
| $I_{sig} - I_{loc}$ | 180 | 0 | −90 | 90 |

Next, the interfering beams, $F_1$ to $F_4$, entering the PDs, 61 to 64, in dependence on a phase difference between the signal beam Sig and the local beam Loc will be described. Assuming that (a) an interfering beam has a phase difference pS against the signal beam Sig and a phase difference pL against the local beam Loc, (b) a phase difference between the signal beam Sig and the local beam Loc to be θ, (c) a frequency of the signal beam Sig, or the local beam Loc, to be ω, and (d) magnitudes of the signal beam Sig and the local beam Loc to be unity (1), an electric field E and power P may be denoted as:

$$E_{Sig} = e^{i(\omega t + \theta)}$$

$$E_{Lo} = e^{i\omega t}$$

$$E_F = (E_{Sig} \times e^{ipS} + E_{Lo} \times e^{ipL})/2$$

$$= e^{i\omega t} \times (e^{i(\theta + pS)} + e^{ipL})/2$$

$$= \cos\{(\theta + pS - pL)/2\} \times e^{i(\omega t + (\theta + pS + pL)/2)}$$

$$P_F = |E|^2$$

$$= \cos^2\{(\theta + pS - pL)/2\}$$

$$= \{\cos(\theta + pS - pL) + 1\}/2$$

When the signal beam Sig and the local beam Loc enter the 2×4 MMI element 51 at respective ports, $I_{sig}$ and $I_{loc}$, opposite to those shown in FIG. 2, that is, when the signal beam Sig enters at the input port $I_{loc}$; while, the local beam Loc enters at the input port $I_{sig}$; the power of an interfering beam may be obtained by replacing θ with −θ:

$$P' = |E'|^2$$

$$= \cos^2\{(-\theta + pS - pL)/2\}$$

$$= \{\cos(\theta - pS + pL) + 1\}/2$$

Figure 3A:
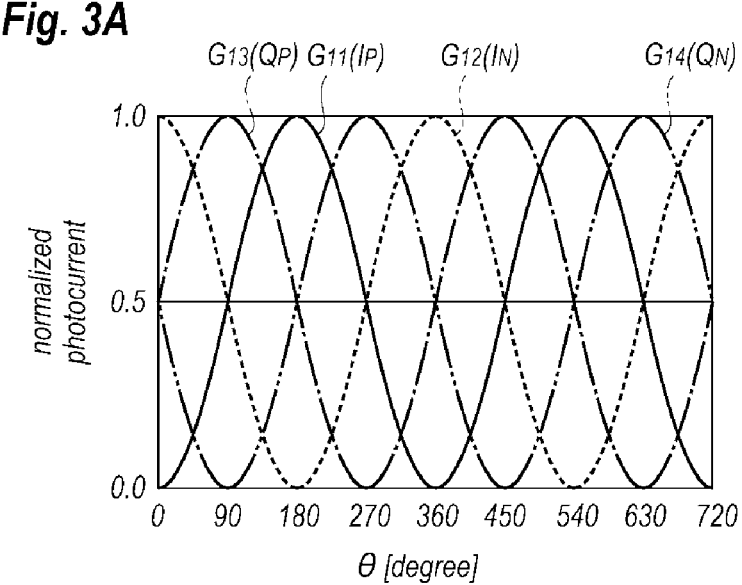
FIG. 3A shows normalized intensities of photocurrents against a phase, where the photocurrents correspond to four interfering beams generated by the optical 90° hybrid shown in FIG. 2.
Figure 3B:
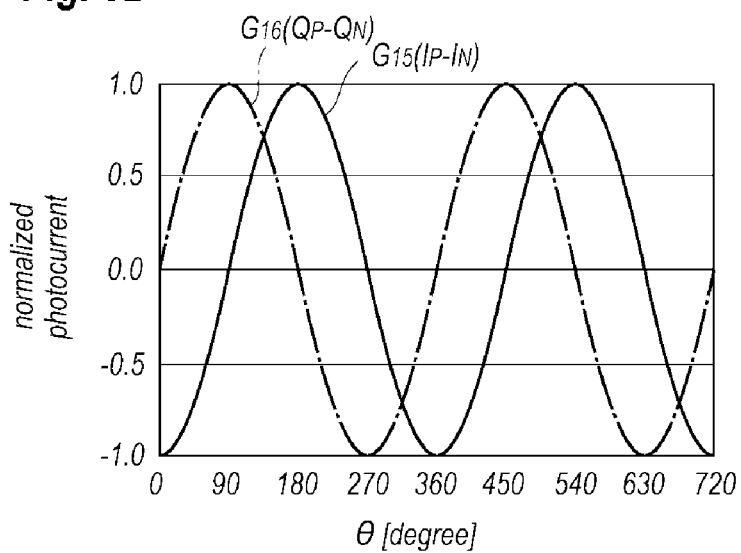
FIG. 3B shows normalized differences of the photocurrents between the signal beam and the local beam for the in-phase component and the quadrature component, respectively.

FIG. 3A and FIG. 3B show normalized intensities of the photocurrents output from the PDs, 61 to 64, corresponding to the interfering beams, $F_1$ to $F_4$, respectively, against the phase difference θ between the signal beam Sig and the local beam Loc, where a horizontal axis corresponds to the phase difference θ; while, a vertical axis shows the normalized photocurrents output from the PDs, 61 to 64. In FIG. 3B, a behavior $G_{15}$ corresponds to a difference between the behaviors, $G_{11}(I_P)$ and $G_{12}(I_N)$, while, another behavior $G_{16}$ corresponds to a difference between behaviors, $G_{13}(Q_P)$ and $G_{14}(Q_N)$. In the optical 90° hybrid shown in FIG. 2, the quadrature component ($Q_P$-$Q_N$) advances the phase thereof by 90° against the in-phase component ($I_P$-$I_N$); which is called as the advanced-Q mode.

Figure 4:
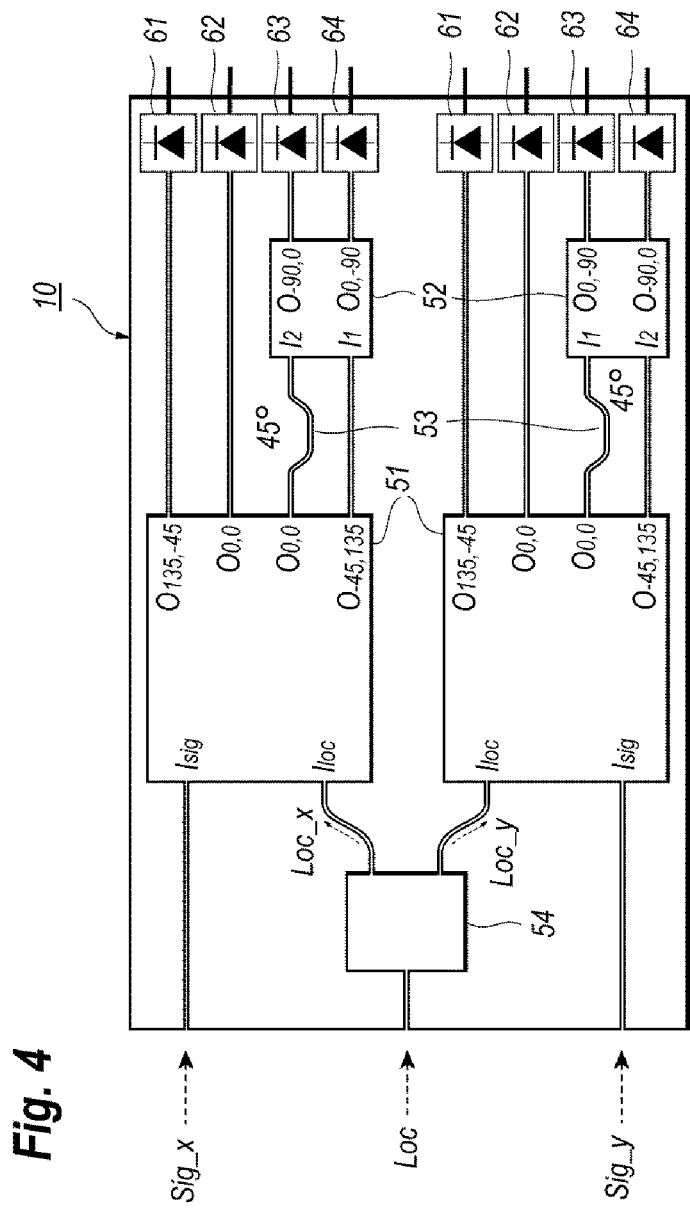
FIG. 4 shows a layout that simply disposes two optical 90° hybrids side by side in addition to a splitter on a unique substrate.

Let us now consider a case where, in an optical coherent receiver able to carry out the DP-QPSK modulation, an optical 90° hybrid for the X-polarization, another optical 90° hybrid for the Y-polarization, and an optical splitter that splits the local beam are monolithically integrated on a common substrate. FIG. 4 shows a layout that disposes, on a unique substrate 10, two optical 90° hybrids side by side and a splitter 54. In such a layout, the disposition of the input ports in the 2×4 MMI element 51 for the signal beam Sig_y originating the Y-polarization and that for the local beam Loc_y reverses the disposition of the input ports in the 2×4 MMI element 51 for the signal beam Sig_x originating the X-polarization and that for the local beam Loc_x.

Figure 5A:
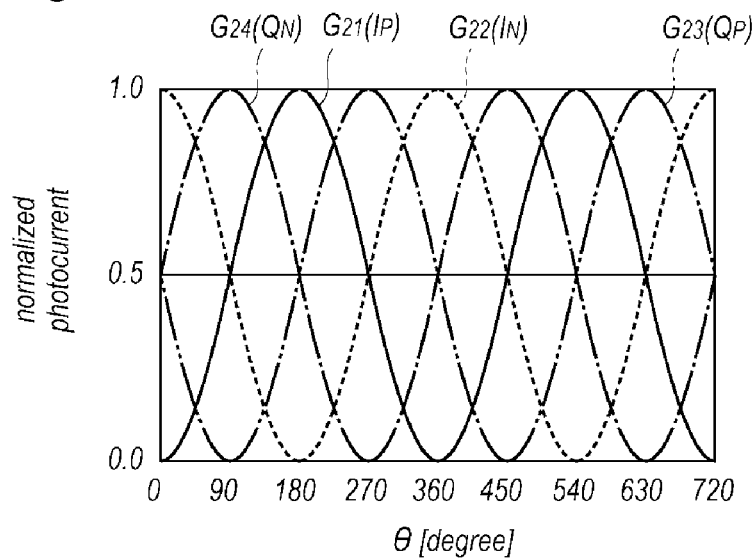
FIG. 5A shows normalized intensities of the photocurrents corresponding to four interfering beams, F1 to F4, against the phase θ when the input ports for the signal beam Sig and the local beam Loc of the 2×4 MMI element, respectively.
Figure 5B:
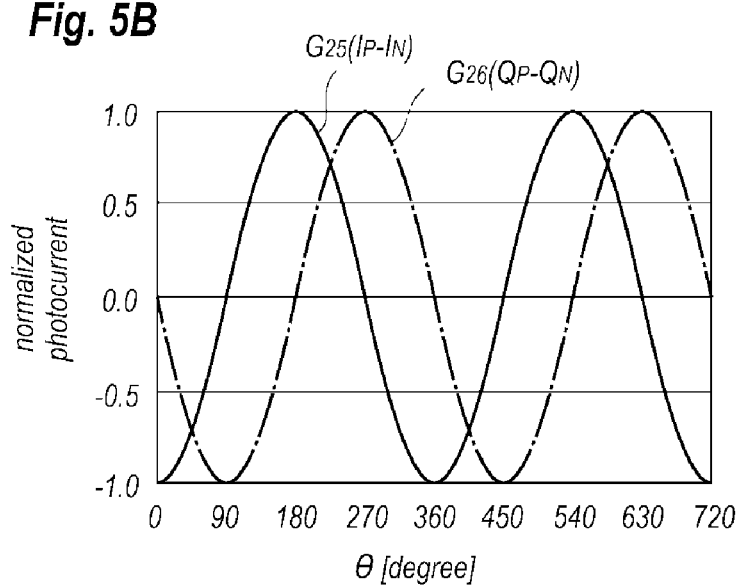
FIG. 5B shows normalized differences between the photocurrents corresponding to the in-phase component and those corresponding to the quadrature component, respectively.

FIG. 5A shows normalized intensities of four interfering beams, $F_1$ to $F_4$, against the phase θ when the input ports, $I_{sig}$ and $I_{loc}$, of the 2×4 MMI element reverses, where behaviors, $G_{21}$ to $G_{24}$, correspond to the interfering beams, $F_2(I_P)$, $F_4(Q_P)$, and $F_3(Q_N)$, respectively; while, FIG. 5B shows normalized difference between the photocurrents corresponding to the interfering beams, $F_2(I_P)$ and the $F_1(I_N)$, and the difference between the photocurrents corresponding to the interfering beams, $F_4(Q_P)$ and $F_3(Q_N)$, respectively. As shown in FIG. 5B, the phases of the quadrature components, $Q_P$ and $Q_N$, delay by 90° with respect to the in-phase components, $I_P$ and $I_N$, which may be called as the delayed-Q mode, where the input, $I_{sig}$ and $I_{loc}$, ports of the MMI element 51 reverse the positions thereof from those shown in FIG. 2.

Thus, disposing two optical 90° hybrids side by side, one of which is forced to be configured with the advanced-Q mode; while, the other is forced to be configured with the delayed-Q mode. Accordingly, the coherent optical receiver 2A must prepare two types of electronic circuits, such as trans-impedance amplifiers, implemented downstream of the optical circuit when two optical 90° hybrids shown in FIG. 2 with the arrangements thereof same with each other, which means that the coherent optical receiver 2A in an architecture thereof must be complex.

The optical circuit 1A according to the present embodiment replaces a position of the phase shifter 29a from the position of the phase shifter 53 shown in FIG. 2 to a position downstream the output port $O_{−45,135}$ of the second 2×4 MMI element 16. Also, the phase shifter 29a shifts the phase of the beam output from the output port $O_{−45,135}$ by −135° not −45°. Table 3A below summarizes the phases of the signal beam Sig_x with the X-polarization, the local beam Loc_x, and the phase difference between the signal beam Sig_x and the local beam Loc_x; while, Table 3B summarizes the phases of the signal beam Sig_y originating to the Y-polarization, that of the local beam Loc_y, and the phase difference therebetween.

TABLE 3A

|  | $F_4:O_{135,-45}$ | $F_3:O_{0,0}$ | $F_2:O_{0,0}$ | $F_2$ at $I_2$ | $F_1$ at $I_1$ | $F_6:O_{-90,0}$ | $F_5:O_{0,-90}$ |
|---|---|---|---|---|---|---|---|
| Sig_x | 135 | 0 | 0 | −45 | −45 | −90 | −90 |
| Loc_x | −45 | 0 | 0 | −45 | 135 | 0 | 180 |
| Sig_x−Loc_x | 180 | 0 |  |  |  | −90 | 90 |

TABLE 3B

|  | $F_7:O_{135,-45}$ | $F_8:O_{0,0}$ | $F_9$ at $I_1$ | $F_{10}:O_{-45,135}$ | $F_{10}$ at $I_2$ | $F_{11}:O_{0,-90}$ | $F_{12}:O_{-90,0}$ |
|---|---|---|---|---|---|---|---|
| Loc_y | 135 | 0 | 0 | −45 | 180 | 45 | −135 |
| Sig_y | −45 | 0 | 0 | 135 | 0 | −45 | −45 |
| Sig_y−Loc_y | 180 | 0 |  |  |  | −90 | 90 |

As listed in Table 3A, The optical circuit 1A according to the present embodiment, the phase differences between the signal beam Sig_x with the X-polarization and the local beam Loc_x after the interference at the first 2×4 MMI element 15 and the first 2×2 MMI element 17 become 180° ($F_4$: $X_{IN}$), 0° ($F_3$: $X_{IP}$), −90° ($F_6$: $X_{QN}$), and 90° ($F_5$: $X_{QP}$), respectively, from the side of the edge 10d. Similarly, for the signal beam Sig_y originating to the Y-polarization, the phase difference between the signal beam Sig_y and the local beam Loc_y become 180° ($F_7$: $Y_{IN}$), 0° ($F_8$: $Y_{IP}$), −90° ($F_{11}$: $Y_{QN}$), and 90° ($F_{12}$: $Y_{QP}$), respectively.

Figure 6A:
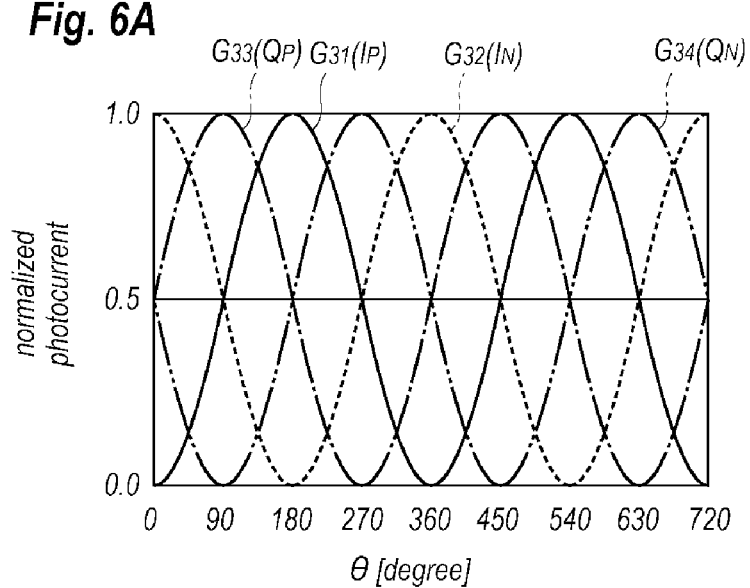
FIG. 6A shows normalized intensities of the photocurrents corresponding to four interfering beams, $F_7$, $F_8$, $F_{11}$, and $F_{12}$, for the signal beam Sig_y against relative phases thereof.
Figure 6B:
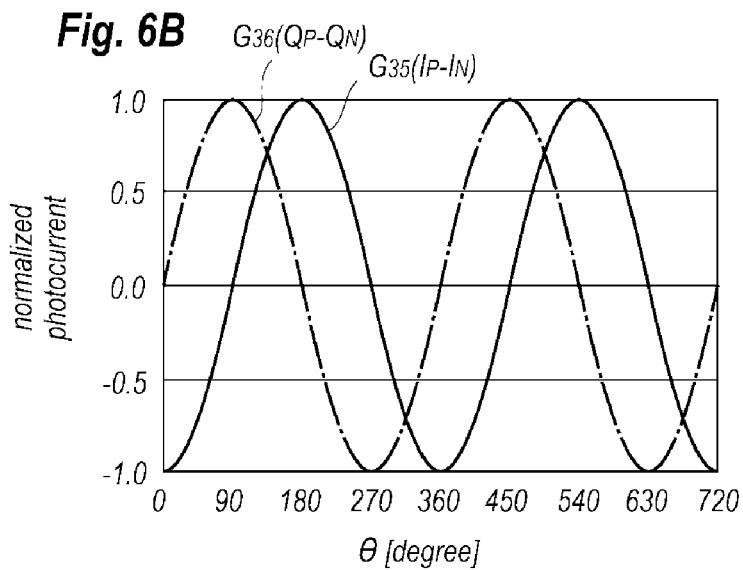
FIG. 6B shows normalized difference between the photocurrents corresponding to the interfering beams, $F_7$ ($Y_{IN}$) and the $F_8$ ($Y_u$), and the difference between the photocurrents corresponding to the interfering beams, $F_{11}$ ($Y_{QN}$) and $F_{12}$ ($Y_{QP}$), respectively.

FIG. 6A shows normalized intensities of the photocurrents corresponding to the interfering beams, $F_7$, $F_8$, $F_{11}$, and $F_{12}$, against the phase θ, where behaviors, $G_{31}$ to $G_{34}$, are those of the interfering beams, $F_8(Y_{IP})$, $F_7(Y_{IN})$, $F_{12}(Y_{Q}p)$, and $F_{11}(Y_{QN})$, each output from the PDs, 36, 35, 38, and 37, respectively. While, FIG. 6B shows normalized difference $G_{35}$ between the photocurrents corresponding to the interfering beams, $F_8(Y_{IP})$ and $F_7(Y_{IN})$, and the difference $G_{36}$ between the photocurrents corresponding to the interfering beams, $F_{12}(Y_Qp)$ and $F_{11}(Y_{QN})$, respectively. As shown in FIG. 6B, in the present embodiment, the phases of the quadrature components, $Y_{QP}$ and $Y_{QN}$, advance by 90° with respect to the in-phase components, $X_{IP}$ and $X_{IN}$, which is the advanced-Q mode. Accordingly, the phase relation between the $X_I$ component and the $X_Q$ component becomes the advanced-Q mode, which is identical with the phase relation between the $Y_I$ component and the $Y_Q$ component of the advanced-Q mode, which means that the two optical 90° hybrids and the beam splitter 14 may be integrated on the unique substrate 10 without preparing two types of downstream electronic circuits.

Figure 7A:
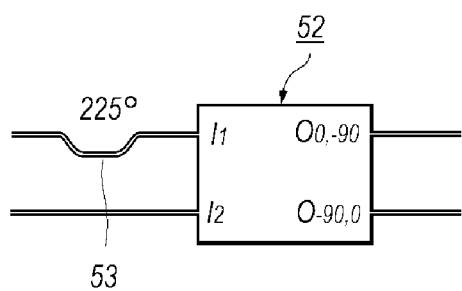
FIG. 7A to FIG. 7C explain why the phase shifter in the optical circuit shown in FIG. 1 sets the shift to be 135°.
Figure 7B:
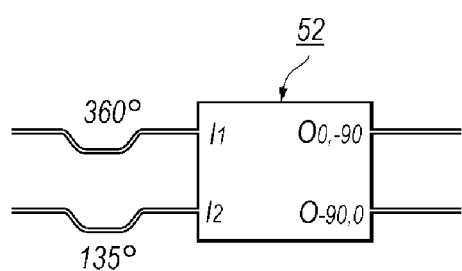
Figure 7C:
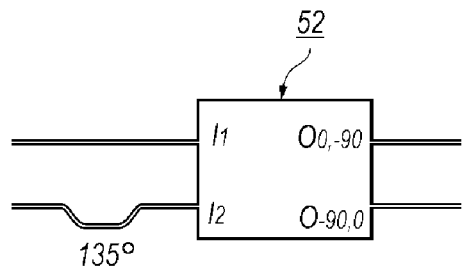

A reason why the phase shifter 29a of the present embodiment shifts the phase by 135° not 45° will be described as follows. That is, in order to realize the advanced-Q mode for the MIMI element 51 with the reversed input ports, $I_{sig}$ and $I_{loc}$, for the signal beam Sig and the local beam Loc, the phase shifter 53 shifts the phase by 225°, as shown in FIG. 7A. The phase shift of 225° is equivalent to an arrangement where one of the input beam for the MMI element 52 sets the phase shift by 360°, while, the other input beam sets the phase shift by 135° as shown in FIG. 7B. Also, the phase shift of 360° is equivalent to the phase shift of 0°, namely, no phase shift, as shown in FIG. 7C. Therefore, setting the phase shift by 135°, the wavelength in the phase shifter 29a may shorten the length thereof and the substrate 10 may be shrunk compared with an arrangement where the phase shifter 29a shifts the phase by 225°.

The optical circuit 1A like the present embodiment, which is provided on the substrate 10, provides the first input port 11, the second input port 12, and the third input port 13 on the substrate 10, where the first input port 11 optically couples with the input port $I_{sig}$ of the first 2×4 MIMI element 15 and enters the signal beam Sig_x with the X-polarization thereto. The second input port 12 optically couples with the input port $I_{sig}$ of the second 2×4 MMI element 16 and enters the other signal beam Sig_y originating to the Y-polarization thereto. The third input port 13 optically couples with the optical splitter 14 and enters the local beam Loc thereto. Also, the third input port 13 may be disposed between the first and second input ports, 11 and 12. According to the disposition of those input ports, 11 to 13, the local beam Loc may be coupled with the optical splitter 14 and split into two 2×4 MMI elements, 15 and 16, without intersecting the waveguides, 22 and 26, for the signal beams, Sig_x and Sig_y, with the waveguides, 23 and 27, for the local beams, Loc_x and Loc_y.

First Modification

Figure 8:
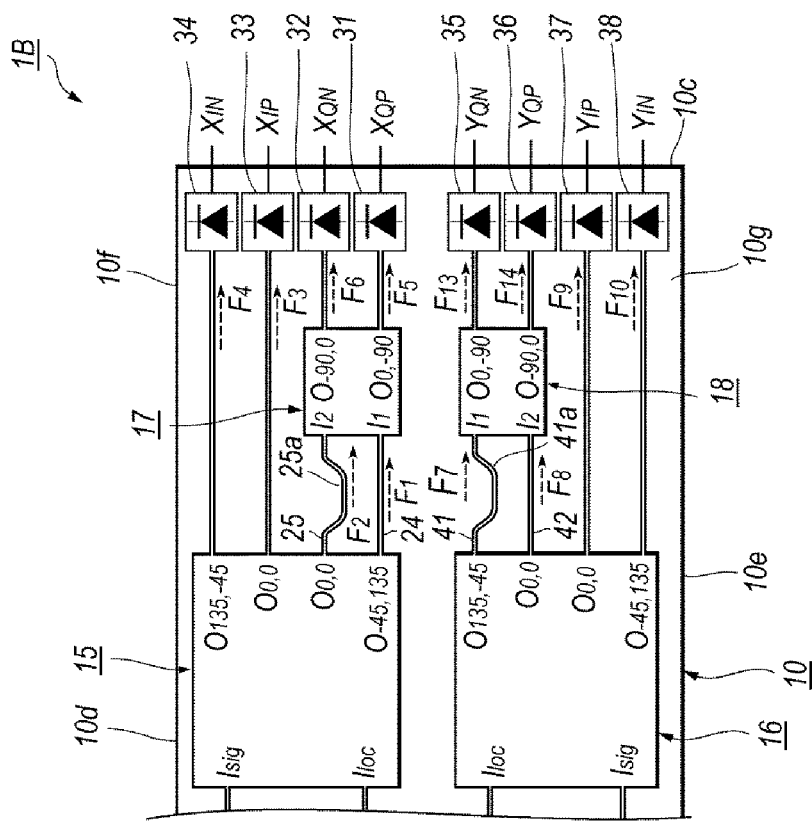
FIG. 8 magnifies the MMI elements, 15 to 18, and coupling relations of another optical circuit according to the first modification of the present invention.

FIG. 8 magnifies the MMI elements, 15 to 18, and coupling relations of another optical circuit 1B according to the first modification of that shown in FIG. 1. The optical circuit 1B has features distinguishable from those shown in FIG. 1 that dispositions of the MMI element 18 and the phase shifter 41a are different from those shown in FIG. 1. That is, the second 2×2 MMI element 18 of the present modification in the first input port $I_1$ thereof couples with the first port $O_{135,-45}$ of the second 2×4 MMI element 16 through the waveguide 41 that includes the phase shifter 41a, while, the second input port $I_2$ directly couples with the output port $O_{0,0}$. The first output port $O_{0,90}$ of the second 2×2 MMI element 18 generates an interfering beam $F_{13}$, while, the other output port $O_{-90,0}$ thereof generates another interfering beam $F_{14}$. The phase shifter 41a shifts the phase of the beam passing therethrough by −135°. That is, a beam passing the waveguide 41 shifts the phase thereof by −135° with respect to a beam passing the other waveguide 42 provided from the second output port $O_{0,0}$ of the second 2×4 MMI element 16 to the second input port $I_2$ of the second 2×2 MMI element 18.

Table 4A below summarizes the phases of the signal beam Sig_x with the X-polarization and the local beam Loc_x when they appear in respective interfering beams, and the phase difference between the signal beam Sig_x and the local beam Loc_x; while, Table 4B summarizes the phases of the signal beam Sig_y originating to the Y-polarization and the local beam Loc_y when they appear in respective interfering beams, and the phase difference therebetween. The phases and the phase difference for the signal beam Sig_x originating to the X-polarization are identical with those listed in Table 3A. The phases concerning the signal beam Sig_y originating to the Y-polarization become, from the side of the edge $10d$ of the substrate 10, $-90°$ ($F_{13}$: $Y_{QN}$), $90°$ ($F_{14}$: $Y_{QP}$), $0°$ ($F_9$: $Y_{IP}$), and $180°$ ($F_{10}$: $Y_{IN}$), respectively.

TABLE 4A

| | $F_4$:$O_{135,-45}$ | $F_3$:$O_{0,0}$ | $F_2$:$O_{0,0}$ | $F_2$ at $I_2$ | $F_1$ at $I_1$ | $F_6$:$O_{-90,0}$ | $F_5$:$O_{0,-90}$ |
|---|---|---|---|---|---|---|---|
| Sig_x | 135 | 0 | 0 | −45 | −45 | −90 | −90 |
| Loc_x | −45 | 0 | 0 | −45 | 135 | 0 | 180 |
| Sig_x-Loc_x | 180 | 0 | | | | −90 | 90 |

TABLE 4B

| | $F_7$:$O_{135,-45}$ | $F_7$ at $I_1$ | $F_8$ at $I_2$ | $F_{13}$:$O_{0,-90}$ | $F_{14}$:$O_{-90,0}$ | $F_9$:$O_{0,0}$ | $F_{10}$:$O_{-45,135}$ |
|---|---|---|---|---|---|---|---|
| Loc_y | 135 | 0 | 0 | −45 | −45 | 0 | −45 |
| Sig_y | −45 | 180 | 0 | −135 | 45 | 0 | 135 |
| Sig_y-Loc_y | | | | −90 | 90 | 0 | 180 |

Figure 9A:
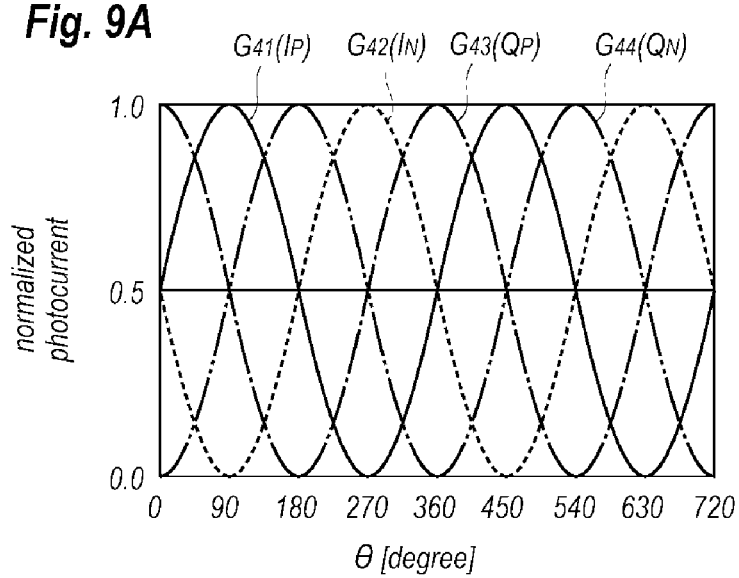
FIG. 9A shows normalized intensities of the photocurrents corresponding to four interfering beams, $F_{13}$, $F_{14}$, $F_9$, and $F_{10}$, generated by the optical circuit shown in FIG. 8 against the phase θ.
Figure 9B:
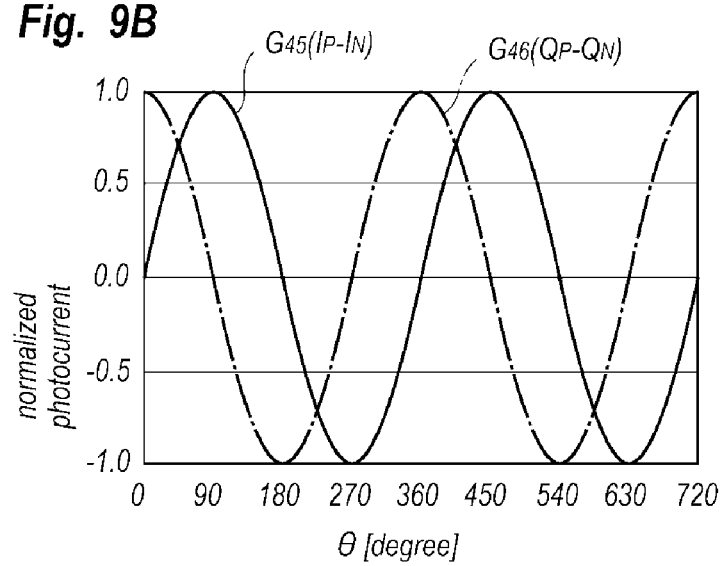
FIG. 9B shows normalized differences between the photocurrents for the in-phase component and the quadrature component, respectively.

FIG. 9A shows normalized intensities of the photocurrents corresponding to four interfering beams against the phase θ, where behaviors, $G_{41}$ to $G_{44}$, correspond to the interfering beams, $F_9$($Y_{IP}$), $F_{10}$($Y_{IN}$), $F_{14}$($Y_{QP}$), and $F_{13}$($Y_{QN}$), each output from the PDs, 37, 38, 36, and 35, respectively. While, FIG. 9B shows normalized difference $G_{45}$ between the photocurrents corresponding to the interfering beams, $F_9$($Y_{IP}$) and $F_{10}$($Y_{IN}$), and the difference $G_{46}$ between the photocurrents corresponding to the interfering beams, $F_{14}$($Y_Q$p) and $F_{13}$($Y_{QN}$), respectively. As shown in FIG. 9B, in the present modification of the optical circuit 1B, the phases of the quadrature components, $Y_{QP}$ and $Y_{QN}$, advance by 90° with respect to the in-phase components, $Y_{IP}$ and $Y_{IN}$, which is the advanced-Q mode. Accordingly, the phase relation between the components for the signal beam Sig_y becomes the advanced-Q mode, which is identical with the phase relation between the in-phase and quadrature components for the signal beam Sig_x of the advanced-Q mode, which means that the two optical 90° hybrids and the beam splitter 14 may be integrated on the unique substrate 10 without preparing two types of downstream electronic circuits.

Second Modification

Figure 10:
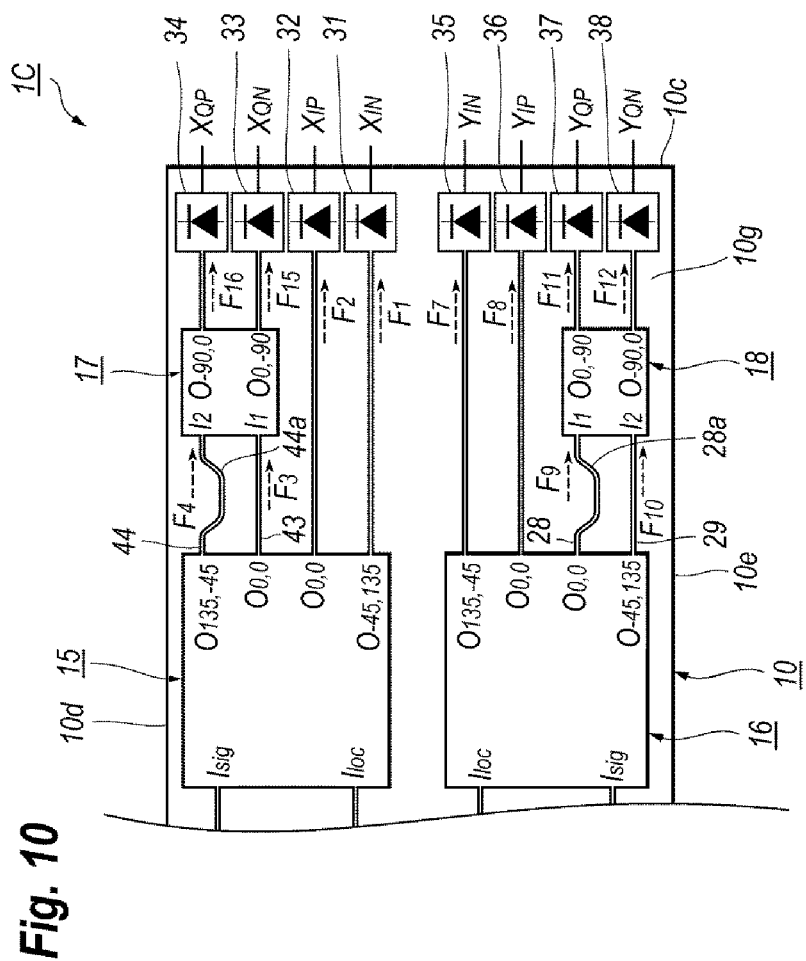
FIG. 10 magnifies the MMI elements and coupling relations of still another optical circuit that is modified from the optical circuit shown in FIG. 1.

FIG. 10 magnifies the MMI elements, 15 to 18, and coupling relations of still another optical circuit 1C that is also modified from the optical circuit 1A shown in FIG. 1. The optical circuit 1C has features distinguishable from those shown in FIG. 1 and FIG. 8 in dispositions of the first 2×2 MMI element 17 and two phase shifters, 28a and 44a. That is, the first 2×2 MMI element 17 of the present modification in the first input port $I_1$ thereof directly couples with the output port $O_{0,0}$ of the first 2×4 MMI element 15 through the waveguide 43, while, the second input port $I_2$ couples with the output port $O_{135,-45}$ through the waveguide 44 that includes the phase shifter 44a. The first 2×2 MMI element 17 generates the interfering beams, $F_{15}$ and $F_{16}$, in the output ports, $O_{0,-90}$ and $O_{-90,0}$, thereof. The phase shifter 44a shifts the phase of the interfering beam $F_4$ passing therethrough by $-135°$; that is the interfering beam $F_4$ delays the phase thereof by 135° with respect to another interfering beam $F_3$ output from the output port $O_{0,0}$ and entering the first input port $I_1$ of the first 2×2 MMI element 17 through the waveguide 43.

Moreover, the optical circuit 1C of the present modification further provides another phase shifter 28a instead of the phase shifter 29a in the previous optical circuit 1A shown in FIG. 1. That is, the optical circuit 1C provides the phase shifter 28a in the waveguide 28 connecting the output port $O_{0,0}$ of the second 2×4 MMI element 16 with the first input port $I_1$ of the second 2×2 MMI element 18. The phase shifter 28a shifts the phase of the interfering beam $F_9$ passing therethrough by $-45°$, which means that the interfering beam $F_9$ output from the output port $O_{0,0}$ of the second 2×4 MMI element 16 to the first input port $I_1$ of the second 2×2 MMI element 18 delays the phase thereof by 45° with respect to another interfering beam $F_{10}$ output from the output port $O_{-45,135}$ of the second 2×4 MMI element 16 to the second input port $I_2$ of the second 2×2 MMI element 18.

Table 5A below summarizes the phases of the signal beam Sig_x with the X-polarization and the local beam Loc_x at the respective ports, and the phase difference between the signal beam Sig_x and the local beam Loc_x (Sig_x-Loc_x); while, Table 5B summarizes the phases of the signal beam Sig_y originating to the Y-polarization and the local beam Loc_y at the respective ports, and the phase difference therebetween (Sig_y Loc_y). As shown in Table 5A, two MMI elements, 15 and 17, accompanying with the phase shifter 44a therebetween may generate four interfering beams each having the phase differences between the signal beam Sig_x and the local beam Loc_x of 90° ($F_{16}$; $X_{QP}$), $-90°$ ($F_{15}$; $X_{QN}$), 0° ($F_2$; $X_{IP}$), and 180° ($F_{IN}$), respectively. Similarly, as shown in Table 5B, two MMI elements, 16 and 18, accompanied with the phase shifter 28a therebetween may generate four interfering beams each having the phase differences between the signal beam Sig_y and the local beam Loc_y of 180° ($F_7$; $Y_{IN}$), 0° ($F_8$; $Y_{IP}$), 90° ($F_{11}$; $Y_{QP}$), and $-90°$ ($F_{12}$; $Y_{QN}$), respectively.

TABLE 5A

| | $F_4:O_{135,-45}$ | $F_4$ at $I_2$ | $F_3$ at $I_1$ | $F_{16}:O_{-90,0}$ | $F_{15}:O_{0,-90}$ | $F_2:O_{0,0}$ | $F_1:O_{-45,135}$ |
|---|---|---|---|---|---|---|---|
| Sig_x | 135 | 0 | 0 | −45 | −45 | 0 | −45 |
| Loc_x | −45 | 180 | 0 | −135 | 45 | 0 | 135 |
| Sig_x−Loc_x | | | | 90 | −90 | 0 | 180 |

TABLE 5B

| | $F_7:O_{135,-45}$ | $F_8:O_{0,0}$ | $F_9:O_{0,0}$ | $F_9$ at $I_1$ | $F_{10}$ at $I_2$ | $F_{11}:O_{0,-90}$ | $F_{12}:O_{-90,0}$ |
|---|---|---|---|---|---|---|---|
| Loc_y | 135 | 0 | 0 | −45 | −45 | −90 | −90 |
| Sig_y | −45 | 0 | 0 | −45 | 135 | 0 | 180 |
| Sig_y−Loc_y | 180 | 0 | | | | 90 | −90 |

Figure 11A:
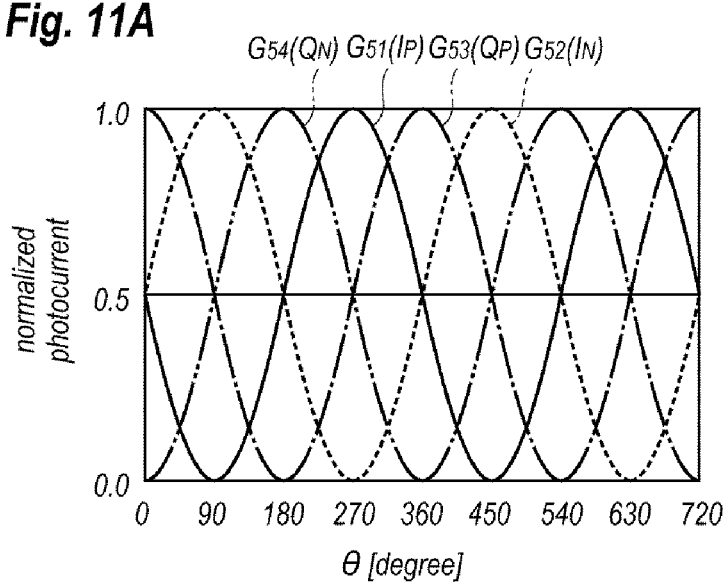
FIG. 11A shows normalized intensities of photocurrents corresponding to four interfering beams, $F_{16}$, $F_{15}$, $F_2$, and $F_1$, generated by the optical circuit shown in FIG. 10 against the phase θ.
Figure 11B:
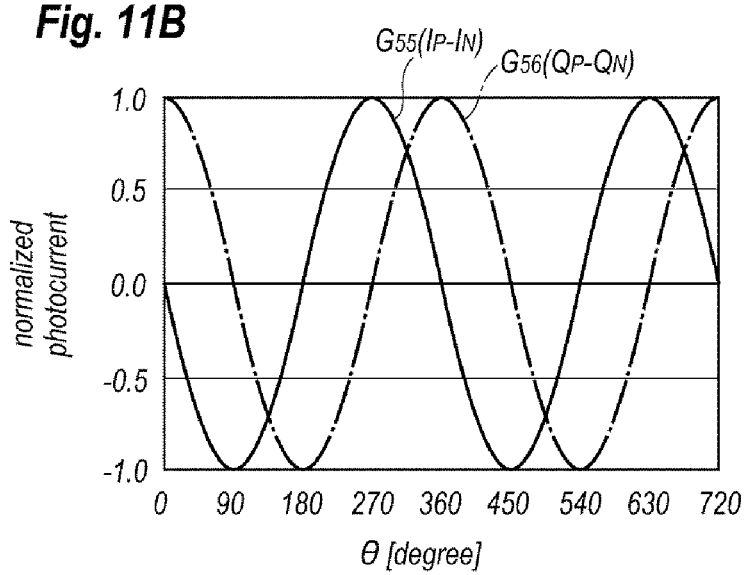
FIG. 11B shows normalized differences between the photocurrents of the in-phase component and the quadrature component, respectively.

FIG. 11A shows normalized intensities of photocurrents corresponding to four interfering beams in the optical circuit 1C of the present modification against the phase θ, where behaviors, $G_{51}$ to $G_{54}$, correspond to the interfering beams, $F_2(X_{IP})$, $F_1(X_{IN})$, $F_{16}(X_{QP})$, and $F_{15}(X_{QN})$, each output from the PDs, 32, 31, 34, and 33, respectively. While, FIG. 11B shows normalized difference $G_{55}$ between the photocurrents derived from the interfering beams, $F_2(X_{IP})$ and $F_1(X_{IN})$, and the difference $G_{56}$ between the photocurrents derived from the interfering beams, $F_{16}(X_{QP})$ and $F_{15}(X_{QN})$, respectively. As shown in FIG. 11B, in the present modification, the phases of the quadrature components, $X_{QP}$ and $X_{QN}$, for the signal beam Sig_x with the X-polarization delays by 90° with respect to the in-phase components, $X_{IP}$ and $X_{IN}$, which is the delayed-Q mode. Also, because the arrangements of the MMI elements, 16 and 18, for the signal beam Sig_y originating to the Y-polarization are same with those shown in FIG. 2, the quadrature components, $Y_{QP}$ and $Y_{QN}$, in the phase thereof delays by 90° against the phase of the in-phase component, $Y_{IP}$ and $Y_{IN}$; that is, the interfering beams, $F_7$, $F_8$, $F_{11}$, and $F_{12}$, for the signal beam Sig_y causes the delayed-Q mode. Thus, the optical circuit 1C of the present modification may set the phase relations for the signal beam Sig_x originating to the X-polarization same with the phase relations for the signal beam Sig_y originating to the Y-polarization; and may integrate two optical 90° hybrids and the optical splitter 14 in the unique substrate 10 without preparing two types of the electronic circuits.

Third Modification

Figure 12:
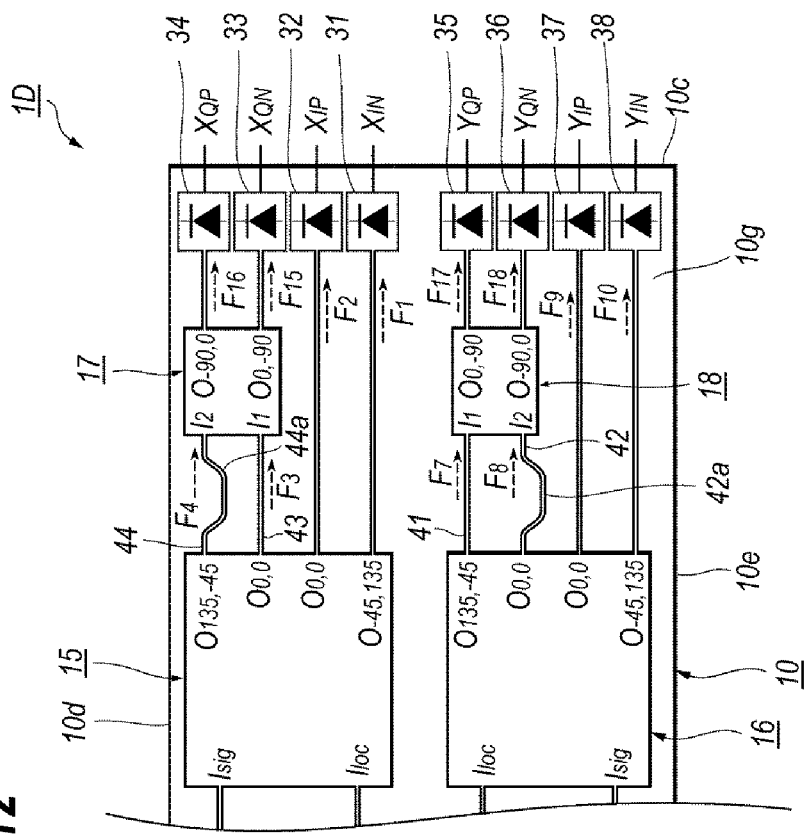
FIG. 12 magnifies the MMI elements and coupling relations therebetween according to another optical circuit of the third modification.

FIG. 12 magnifies the MMI elements, 15 to 18, and coupling relations therebetween according to still another optical circuit 1D of the third modification that is also modified from those shown in FIG. 1. The optical circuit 1D has features distinguishable from those shown in FIG. 1, FIG. 8, and FIG. 10 in the dispositions of the first 2×2 MMI element 17 and two phase shifters, 42a and 44a. That is, the second 2×2 MMI element 18 of the present modification in the first input port $I_1$ thereof directly couples with the output port $O_{135,-45}$ of the second 2×4 MMI element 16 through the waveguide 41, while, the second input port $I_2$ couples with the output port $O_{0,0}$ interposing the phase shifter 42a therebetween. The second 2×2 MMI element 18 generates the interfering beams, $F_{17}$ and $F_{18}$, in the first and second output ports, $O_{0,-90}$ and $O_{-90,0}$, thereof. The phase shifter 42a shifts the phase of the interfering beam $F_8$ output from the output port $O_{0,0}$ of the second 2×4 MMI element 16 by −45°; that is the interfering beam $F_8$ passing the phase shifter 42a delays the phase thereof by 45° with respect to another interfering $F_7$ beam output from the output port $O_{135,-45}$ of the second 2×4 MMI element 16 passing the waveguide 41.

Table 6A below summarizes the phases of the signal beam Sig_x with the X-polarization input in the input port $I_{sig}$ of the first 2×4 MMI element 15 and the local beam Loc_x at respective ports, and the phase difference between the signal beam Sig_x and the local beam Loc_x (Sig_x−Loc_x); while, Table 6B summarizes the phases of the signal beam Sig_y originating to the Y-polarization input in the input port $I_{sig}$ of the second 2×4 MMI element 16 and the local beam Loc_y at respective ports, and the phase difference therebetween (Sig_y−Loc_y). As shown in Table 6A, two MMI elements, 15 and 17, provided for the signal beam Sig_x with the phase shifter 44a therebetween may generate four interfering beams, $F_{16}$, $F_{15}$, $F_2$, and $F_1$, which causes the phase differences between the signal beam Sig_x and the local beam Loc_x of 90° ($F_{16}$; $X_{QP}$), −90° ($F_{15}$; $X_{QN}$), 0° ($F_2$; $X_{IP}$), and 180° ($F_1$; $X_{IN}$), respectively. Similarly, as shown in Table 6B, two MMI elements, 16 and 18, accompanying with the phase shifter 42a therebetween may generate four interfering beams, $F_{17}$, $F_{18}$, $F_9$, and $F_{10}$, each causing the phase differences between the signal beam Sig_y and the local beam Loc_y of 90° ($F_{17}$; $Y_{QP}$), −90° ($F_{18}$; $Y_{QN}$), 0° ($F_9$; $Y_{IP}$), and 180° ($F_{10}$; $Y_{IN}$), respectively.

TABLE 6A

| | $F_4:O_{135,-45}$ | $F_4$ at $I_2$ | $F_3$ at $I_1$ | $F_{16}:O_{-90,0}$ | $F_{15}:O_{0,-90}$ | $F_2:O_{0,0}$ | $F_1:O_{-45,135}$ |
|---|---|---|---|---|---|---|---|
| Sig_x | 135 | 0 | 0 | −45 | −45 | 0 | −45 |
| Loc_x | −45 | 180 | 0 | −135 | 45 | 0 | 135 |
| Sig_x−Loc_x | | | | 90 | −90 | 0 | 180 |

TABLE 6B

|  | $F_7$ at $I_1$ | $F_8$:$O_{0,0}$ | $F_8$ at $I_2$ | $F_{17}$:$O_{0,-90}$ | $F_{18}$:$O_{-90,0}$ | $F_9$:$O_{0,0}$ | $F_{10}$:$O_{-45,135}$ |
|---|---|---|---|---|---|---|---|
| Loc_y | 135 | 0 | −45 | 180 | 0 | 0 | −45 |
| Sig_y | −45 | 0 | −45 | −90 | −90 | 0 | 135 |
| Sig_y−Loc_y |  |  |  | 90 | −90 | 0 | 180 |

Figure 13A:
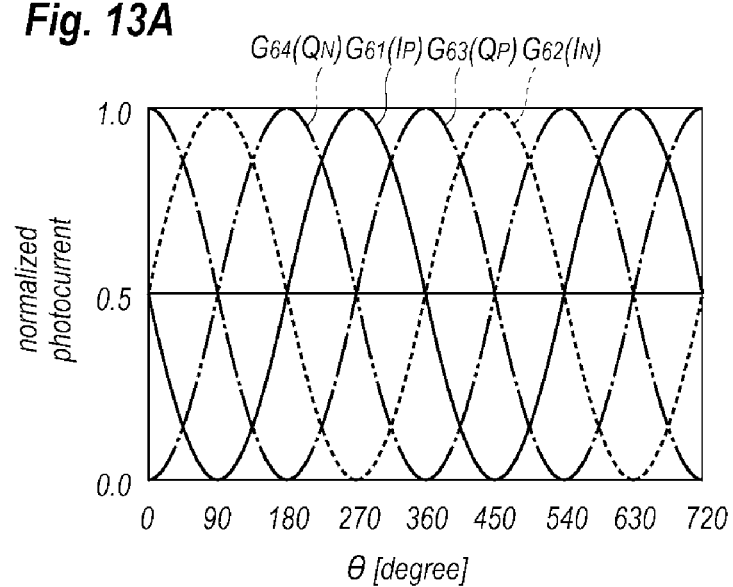
FIG. 13A shows normalized intensities of the photocurrents corresponding to four interfering beams, $F_{17}$, $F_{18}$, $F_9$, and $F_{10}$, generated in the optical circuit shown in FIG. 12.
Figure 13B:
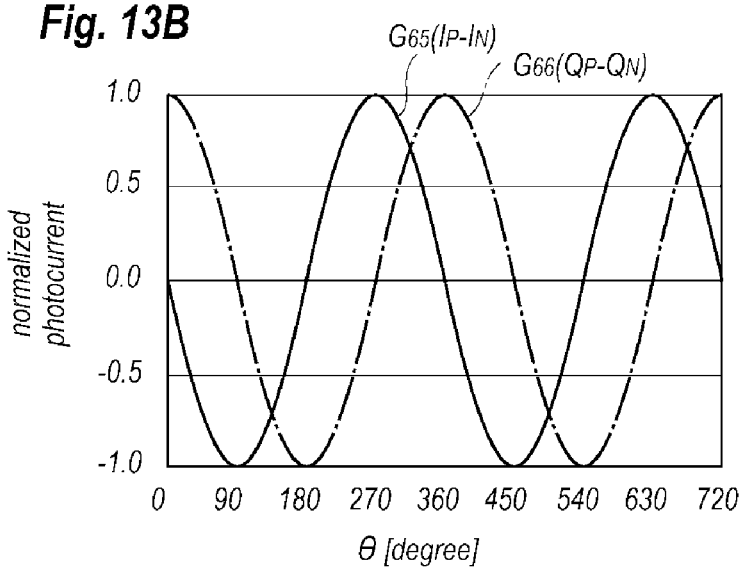
FIG. 13B shows normalized differences between the photocurrents of the in-phase component and the quadrature component, respectively.

FIG. 13A shows normalized intensities of four interfering beams measured by respective photocurrents output from the PDs, 35 to 38, in the optical circuit 1D of the present modification against the phase θ, where behaviors, $G_{61}$ to $G_{64}$, correspond to the interfering beams, $F_9(Y_{IP})$, $F_{10}(Y_{IN})$, $F_{17}(Y_{QP})$, and $F_{18}(Y_{QN})$, each output from the PDs, 37, 38, 35, and 36, respectively. While, FIG. 13B shows normalized difference $G_{65}$ between the photocurrents corresponding to the interfering beams, $F_9(Y_{IP})$ and the $F_{10}$ ($Y_{IN}$), and the difference $G_{66}$ between the photocurrents corresponding to the interfering beams, $F_{17}(Y_{QP})$ and the $F_{18}(Y_{QN})$, respectively. As shown in FIG. 13B, in the present modification, the phases of the quadrature components, $Y_{QP}$ and $Y_{QN}$, for the signal beam Sig_y originating to the Y-polarization delays by 90° with respect to the in-phase components, $Y_{IP}$ and $Y_{IN}$, which is the delayed-Q mode. Also, because the arrangements around two MMI element, 15 and 17, for the signal beam Sig_x originating to the X-polarization are same as those shown in FIG. 10, the quadrature components in the phase thereof delays by 90° against the phase of the in-phase component, namely, the delayed-Q mode. The optical circuit 1D of the present modification may set the phase relations for the signal beam Sig_x originating to the X-polarization same with the phase relations for the signal beam Sig_y originating to the Y-polarization; and may integrate two optical 90° hybrids and the optical splitter 14 in the unique substrate 10 without preparing two types of the electronic circuits.

Fourth Modification

Figure 14:
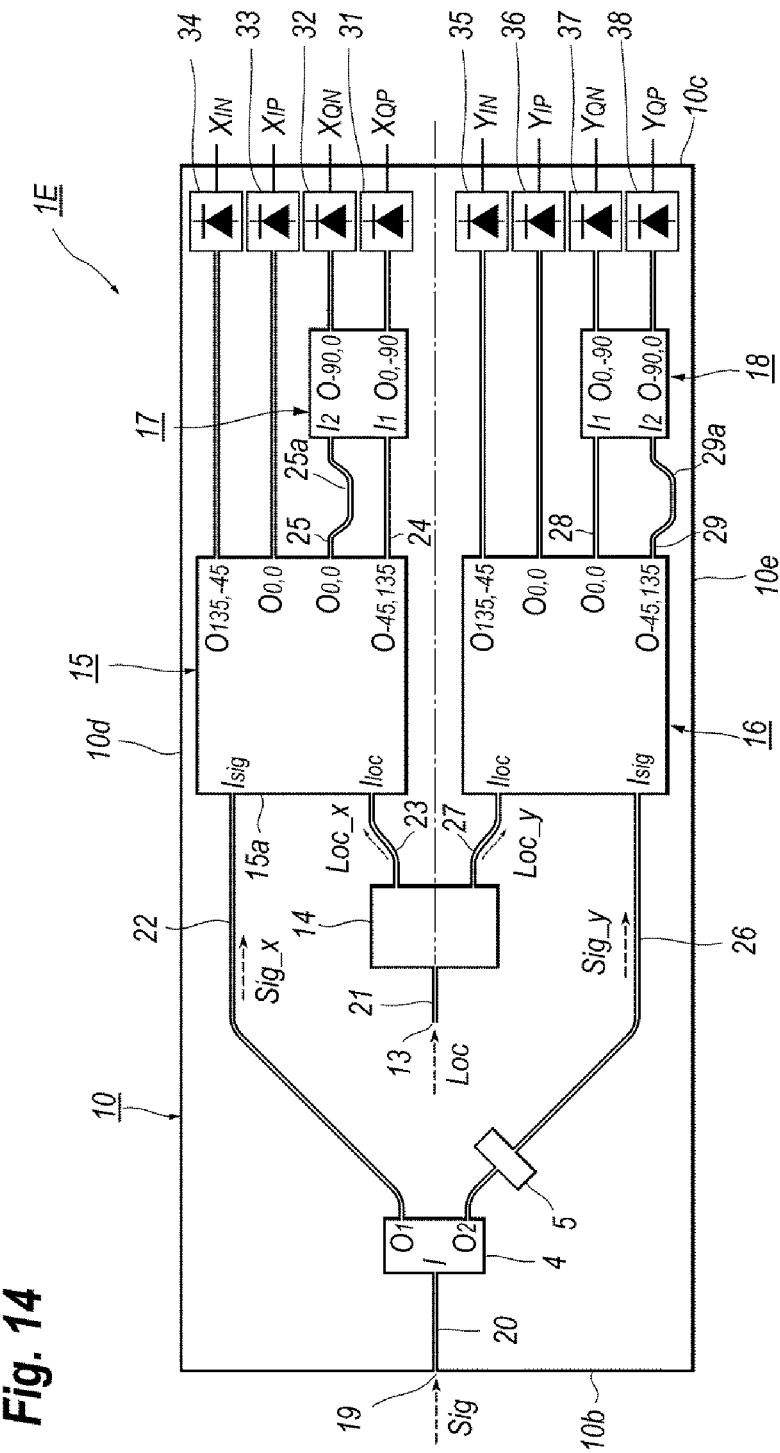
FIG. 14 is a plan view of still another optical circuit according to the fourth modification of the present invention.
Figure 15:
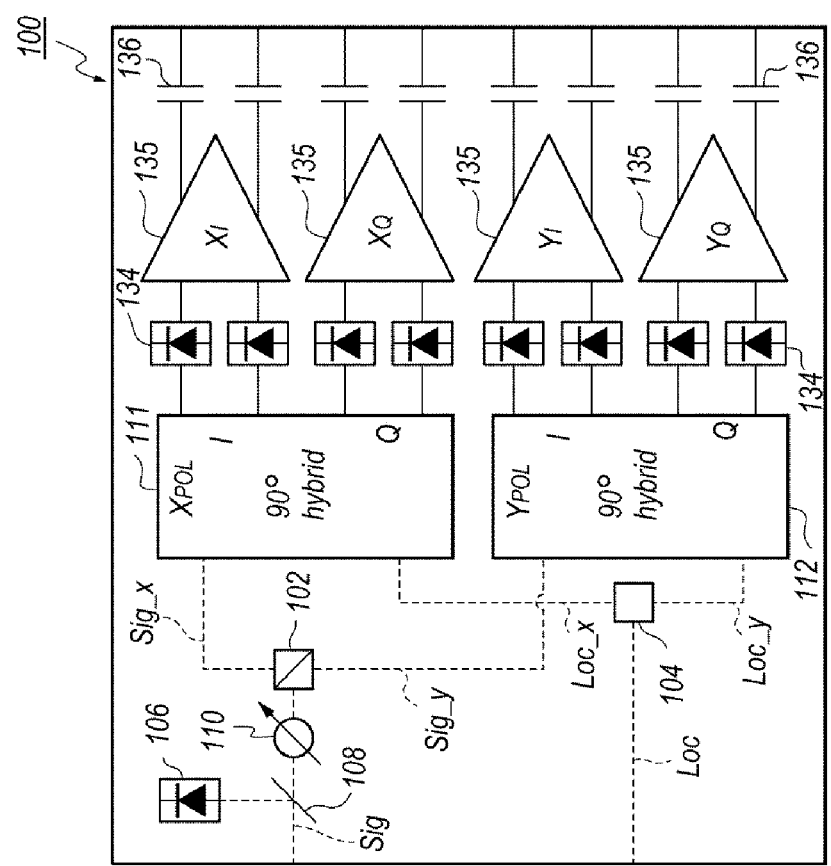
FIG. 15 schematically illustrates a functional block diagram of a conventional optical coherent receiver.

FIG. 14 is a plan view of an optical circuit 1E according to the fourth modification of the present invention. The optical circuit 1E of the present modification further integrates the PBS 4 and the polarization rotator 5 on the unique substrate 10. The PBS 4 provides one input port and two output ports, where the input port of the PBS 4 optically couples with the optical input port 19 of the optical circuit 1E through a waveguide 20. The optical input port 19 receives the signal beam Sig that contains two polarization components orthogonal to each other. The PBS 4 splits the signal beam Sig into two signal beams, Sig_x and Sig_y, depending on the polarizations thereof, where the former signal beam Sig_x enters the input port $I_{sig}$ of the first 2×4 MMI element 15 propagating in the waveguide 22, while, the latter signal beam Sig_y enters the input port $I_{sig}$ of the second 2×4 MMI element 16 propagating in the waveguide 26 and the polarization rotator 5. The polarization rotator 5 rotates the polarization of the signal beam Sig_y by substantially 90°. Accordingly, two signal beams, Sig_x and Sig_y, have polarization directions thereof substantially equal to each other at the inputs ports $I_{sig}$ of the respective 2×4 MMI elements, 15 and 16. The optical circuit 1E, which integrates the PBS 4 and the polarization rotator 5 on the unique substrate 10, not only downsizes the optical coherent receiver 2A but decrease a count of parts implementing therein.

While particular embodiments of an optical 90° hybrid according to the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An optical circuit that receives a signal beam and a local beam, the signal beam being modulated by a configuration of a dual-polarization quadrature phase shift keying (DP-QPSK), the signal beam and the local beam having a common wavelength λ, the signal beam including a first signal beam attributed to a first polarization and a second signal beam originating to a second polarization orthogonal to the first polarization, the optical circuit comprising:

a substrate;

a splitter formed in the substrate, the splitter splitting the local beam into a first local beam and a second local beam;

a first optical 90° hybrid formed in the substrate, the first optical 90° hybrid complementarily extracting in-phase components and quadrature components in the first signal beam, the in-phase components of the first signal beam having phases matching with phases of the first local beam, the quadrature components of the first signal beam having phases shifted by 90° with respect to the first local beam;

a second optical 90° hybrid formed in the substrate, the second optical 90° hybrid complementarily extracting in-phase components and quadrature components in the second signal beam, the in-phase components of the second signal beam having phases matching with phases of the second local beam, the quadrature components of the second signal beam having phases shifted by 90° with respect to the second local beam; and first to fourth waveguides formed in the substrate, the first and second waveguides providing the first signal beam to the first optical 90° hybrid and the second signal beam to the second optical 90° hybrid, respectively, the third and fourth waveguides providing the first local beam to the first optical 90° hybrid and the second local beam to the second optical 90° hybrid, respectively, without intersecting with the first and second waveguides on the substrate, wherein the quadrature components and the in-phase components each extracted in the first optical 90° hybrid have phase statuses identical with phase statuses between the quadrature components and the in-phase components each extracted in the second optical 90° hybrid, wherein the first optical 90° hybrid and the second optical 90° hybrid each includes a 2×4 multi-mode interference (MMI) element, a 2×2 MMI element, and a phase shifter, wherein the 2×4 MMI element includes a signal input port and a local input port, and first to fourth output ports, the first output port causing phase shifts of 135° and −45° for beams inputting to the signal input port and the local input port, respectively, the second and third output ports each causing phase shifts of 0° and 0° for beams inputting to the signal input port and the local input port, respectively, and the fourth output port causing phase shifts of −45° and 135° for beams inputting to the signal input port and the local input port respectively, where angles of 135°, 0°, and −45° correspond to the wavelength λ and include equivalent angles thereof, and wherein the 2×2 MMI element includes first and second input ports and first and second output ports, the first output port causing phase shifts of 0° and −90° for the first input port and the second input, respectively, the second output port causing phase shifts of −90° and 0° for the first input port and the second input port, respectively, where angles of 0°, and −90° correspond to the wavelength λ and include equivalent angles thereof.

2. The optical circuit according to claim 1,
further comprising a polarization beam splitter and a polarization rotator each formed in the substrate, the polarization beam splitter splitting the signal beam into the first signal beam and the second signal beam, the polarization rotator rotating polarization of the second signal beam by 90°.

3. The optical circuit according to claim 1,
wherein, in the first optical 90° hybrid, the first input port of the 2×2 MMI element directly coupling with the fourth output port of the 2×4 MMI element, the second input port of the 2×2 MMI element indirectly coupling with the third output port of the 2×4 MMI element through the phase shifter that shifts a phase of a beam output from the third output port of the 2×4 MIMI element by −45° with respect to another beam output from the fourth output port of the 2×4 MMI element, the first and second output ports of the 2×4 MMI element complementarily generating the in-phase components of the first signal beam, the first and second output ports of the 2×2 MMI element complementarily generating the quadrature components of the first signal beam, and wherein, in the second optical 90° hybrid, the first input port of the 2×2 MMI element directly coupling with the third output port of the 2×4 MMI element, the second input port of the 2×2 MMI element indirectly coupling with the fourth output port of the 2×4 MMI element through the phase shifter that shifts a phase of a beam output from the fourth output port of the 2×4 MMI element by −135° with respect to another beam output from the third output port of the 2×4 MMI element, the first and second output ports of the 2×4 MMI element complementarily generating the in-phase components of the second signal beam, the first and second output ports of the 2×2 MMI element complementarily generating the quadrature components of the second signal beam.

4. The optical circuit according to claim 3,
wherein, in the first optical 90° hybrid, the quadrature components advance the phases thereof by 90° with respect to the in-phase components, and
wherein, in the second optical 90° hybrid, the quadrature components advance the phases thereof by 90° with respect to the in-phase components.

5. The optical circuit according to claim 3,
wherein the second output port of the 2×4 MMI element in the first optical 90° hybrid and the second output port of the 2×4 MMI element in the second optical 90° hybrid each output positive in-phase components, wherein the first output port of the 2×4 MMI element in the first optical 90° hybrid and the first output port of the 2×4 MMI element in the second optical 90° hybrid each output negative in-phase components, wherein the first output port of the 2×2 MMI element in the first optical 90° hybrid and the second output port of the 2×2 MMI element in the second optical 90° hybrid each output positive quadrature components, and wherein the second output port of the 2×2 MMI element in the first optical 90° hybrid and the first output port of the 2×2 MMI element in the second optical 90° hybrid each output negative quadrature components.

6. The optical circuit according to claim 1,
wherein, in the first optical 90° hybrid, the first input port of the 2×2 MMI element directly coupling with the fourth output port of the 2×4 MMI element, the second input port of the 2×2 MMI element indirectly coupling with the third output port of the 2×4 MMI element through the phase shifter that shifts a phase of a beam output from the third output port of the 2×4 MMI element by −45° with respect to another beam output from the fourth output port of the 2×4 MMI element, the first and second output ports of the 2×4 MMI element complementarily generating the in-phase components of the first signal beam, the first and second output ports of the 2×2 MMI element complementarily generating the quadrature components of the first signal beam, and wherein, in the second optical 90° hybrid, the second input port of the 2×2 MMI element directly coupling with the second output port of the 2×4 MMI element, the first input port of the 2×2 MMI element indirectly coupling with the first output port of the 2×4 MMI element through the phase shifter that shifts a phase of a beam output from the first output port of the 2×4 MMI element by −135° with respect to another beam output from the second output port of the 2×4 MMI element, the third and fourth output ports of the 2×4 MMI element complementarily generating the in-phase components of the second signal beam, the first and second output ports of the 2×2 MMI element complementarily generating the quadrature components of the second signal beam.

7. The optical circuit according to claim 6,
wherein, in the first optical 90° hybrid, the quadrature components advance the phases thereof by 90° with respect to the in-phase components, and
wherein, in the second optical 90° hybrid, the quadrature components advance the phases thereof by 90° with respect to the in-phase components.

8. The optical circuit according to claim 6,
wherein the second output port of the 2×4 MMI element in the first optical 90° hybrid and the third output port of the 2×4 MMI element in the second optical 90° hybrid each output positive in-phase components, wherein the first output port of the 2×4 MMI element in the first optical 90° hybrid and the fourth output port of the 2×4 MMI element in the second optical 90° hybrid each output negative in-phase components, wherein the first output port of the 2×2 MMI element in the first optical 90° hybrid and the second output port of the 2×2 MMI element in the second optical 90° hybrid each output positive quadrature components, and wherein the second output port of the 2×2 MMI element in the first optical 90° hybrid and the first output port of the 2×2 MMI element in the second optical 90° hybrid each output negative quadrature components.

9. The optical circuit according to claim 1,
wherein, in the first optical 90° hybrid, the first input port of the 2×2 MMI element directly coupling with the second output port of the 2×4 MMI element, the second input port of the 2×2 MMI element indirectly coupling with the first output port of the 2×4 MMI element through the phase shifter that shifts a phase of a beam output from the first output port of the 2×4 MMI element by −135° with respect to another beam output from the second output port of the 2×4 MMI element, the third and fourth output ports of the 2×4 MMI element complementarily generating the in-phase components of the first signal beam, the first and second output ports of the 2×2 MMI element complementarily generating the quadrature components of the first signal beam, and
wherein, in the second optical 90° hybrid, the second input port of the 2×2 MMI element directly coupling with the fourth output port of the 2×4 MMI element, the first input port of the 2×2 MMI element indirectly coupling with the third output port of the 2×4 MMI element through the phase shifter that shifts a phase of a beam output from the third output port of the 2×4 MMI element by −45° with respect to another beam output from the fourth output port of the 2×4 MMI element, the first and second output ports of the 2×4 MMI element complementarily generating the in-phase components of the second signal beam, the first and second output ports of the 2×2 MMI element complementarily generating the quadrature components of the second signal beam.

10. The optical circuit according to claim 9,
wherein, in the first optical 90° hybrid, the quadrature components delay the phases thereof by 90° with respect to the in-phase components, and
wherein, in the second optical 90° hybrid, the quadrature components delay the phases thereof by 90° with respect to the in-phase components.

11. The optical circuit according to claim 9,
wherein the third output port of the 2×4 MMI element in the first optical 90° hybrid and the second output port of the 2×4 MMI element in the second optical 90° hybrid each output positive in-phase components,
wherein the fourth output port of the 2×4 MMI element in the first optical 90° hybrid and the first output port of the 2×4 MMI element in the second optical 90° hybrid each output negative in-phase components,
wherein the second output port of the 2×2 MMI element in the first optical 90° hybrid and the first output port of the 2×2 MMI element in the second optical 90° hybrid each output positive quadrature components, and
wherein the first output port of the 2×2 MMI element in the first optical 90° hybrid and the second output port of the 2×2 MMI element in the second optical 90° hybrid each output negative quadrature components.

12. The optical circuit according to claim 1,
wherein, in the first optical 90° hybrid, the first input port of the 2×2 MMI element directly coupling with the second output port of the 2×4 MMI element, the second input port of the 2×2 MMI element indirectly coupling with the first output port of the 2×4 MMI element through the phase shifter that shifts a phase of a beam output from the first output port of the 2×4 MMI element by −135° with respect to another beam output from the second output port of the 2×4 MMI element, the third and fourth output ports of the 2×4 MMI element complementarily generating the in-phase components of the first signal beam, the first and second output ports of the 2×2 MMI element complementarily generating the quadrature components of the first signal beam, and
wherein, in the second optical 90° hybrid, the first input port of the 2×2 MMI element directly coupling with the first output port of the 2×4 MMI element, the second input port of the 2×2 MMI element indirectly coupling with the second output port of the 2×4 MMI element through the phase shifter that shifts a phase of a beam output from the second output port of the 2×4 MMI element by −45° with respect to another beam output from the first output port of the 2×4 MMI element, the third and fourth output ports of the 2×4 MMI element complementarily generating the in-phase components of the second signal beam, the first and second output ports of the 2×2 MMI element complementarily generating the quadrature components of the second signal beam.

13. The optical circuit according to claim 12,
wherein, in the first optical 90° hybrid, the quadrature components delay the phases thereof by 90° with respect to the in-phase components, and
wherein, in the second optical 90° hybrid, the quadrature components delay the phases thereof by 90° with respect to the in-phase components.

14. The optical circuit according to claim 12,
wherein the third output port of the 2×4 MMI element in the first optical 90° hybrid and the third output port of the 2×4 MMI element in the second optical 90° hybrid each output positive in-phase components,
wherein the fourth output port of the 2×4 MMI element in the first optical 90° hybrid and the fourth output port of the 2×4 MMI element in the second optical 90° hybrid each output negative in-phase components,
wherein the second output port of the 2×2 MMI element in the first optical 90° hybrid and the first output port of the 2×2 MMI element in the second optical 90° hybrid each output positive quadrature components, and
wherein the first output port of the 2×2 MMI element in the first optical 90° hybrid and the second output port of the 2×2 MMI element in the second optical 90° hybrid each output negative quadrature components.

* * * * *